United States Patent
Bunnell et al.

(10) Patent No.: US 12,481,004 B2
(45) Date of Patent: Nov. 25, 2025

(54) SYSTEMS AND METHODS FOR MONITORING A STATE OF HEALTH OF A BATTERY SYSTEM OF AN ELECTRIC VEHICLE

(71) Applicant: GM GLOBAL TECHNOLOGY OPERATIONS LLC, Detroit, MI (US)

(72) Inventors: Justin Bunnell, Farmington Hills, MI (US); Yanyan Zhang, Troy, MI (US); Andrew M. Zettel, Port Moody (CA); Ziad Shounia, West Bloomfield, MI (US); Shanshan Li Peer, Ann Arbor, MI (US); James Nicholson, Albion, MI (US); Ryan B. Moulliet, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 237 days.

(21) Appl. No.: 18/510,770

(22) Filed: Nov. 16, 2023

(65) Prior Publication Data
US 2025/0164569 A1 May 22, 2025

(51) Int. Cl.
*G01R 31/392* (2019.01)
*B60L 58/16* (2019.01)
(Continued)

(52) U.S. Cl.
CPC ......... *G01R 31/392* (2019.01); *G01R 31/367* (2019.01); *G01R 31/371* (2019.01); *B60L 58/16* (2019.02)

(58) Field of Classification Search
CPC .. G01R 31/392; G01R 31/367; G01R 31/371; G01R 31/36; B60L 58/16
(Continued)

(56) References Cited

U.S. PATENT DOCUMENTS

| 8,111,037 B2 * | 2/2012 | Zhang | G01R 31/392 |
| | | | 324/426 |
| 8,116,998 B2 * | 2/2012 | Hess | G01R 31/392 |
| | | | 702/65 |

(Continued)

FOREIGN PATENT DOCUMENTS

| CN | 116691440 A | 9/2023 |
| DE | 102020004733 A1 | 11/2020 |

(Continued)

OTHER PUBLICATIONS

Nan Xu et al., A Data-Driven Approach to State Health Estimation and Prediction for a Lithium-Ion Battery Pack of Electric Busses Based on Real-World Data, 2022, doi.org, pp. 1-22.*

(Continued)

*Primary Examiner* — Manglesh M Patel
(74) *Attorney, Agent, or Firm* — Ingrassia Fisher & Lorenz, LLP

(57) ABSTRACT

Methods and systems are provided for monitoring a state of health (SOH) of a battery system of an electric vehicle (EV). A projected SOH value of the battery system at one of a future vehicle age and a future total EV mileage is generated. The projected SOH value is based in part on a current SOH value and historical SOH values associated with use of the battery system to supply power to at least one of an offboard vehicle load and an onboard accessory load. A determination is made regarding whether the projected SOH value is less than a SOH threshold at the one of the future vehicle age and the future total EV mileage. A customer SOH alert regarding use of the battery system to supply power to the at least one of the offboard vehicle load and the onboard accessory load is generated based on the determination.

20 Claims, 15 Drawing Sheets

(51) Int. Cl.
*G01R 31/36* (2020.01)
*G01R 31/367* (2019.01)
*G01R 31/371* (2019.01)

(58) Field of Classification Search
USPC .................................................. 701/31.9, 22
See application file for complete search history.

(56) References Cited

U.S. PATENT DOCUMENTS

| | | | | |
|---|---|---|---|---|
| 8,315,829 | B2* | 11/2012 | Zhang | H01M 10/482 |
| | | | | 702/63 |
| 10,326,176 | B2* | 6/2019 | Wang | B60L 3/12 |
| 10,569,660 | B2* | 2/2020 | Lee | H01M 10/44 |
| 11,506,719 | B2* | 11/2022 | Chen | F02N 11/0866 |
| 11,705,590 | B1* | 7/2023 | Budan | G01R 31/3842 |
| | | | | 701/106 |
| 2005/0024061 | A1* | 2/2005 | Cox | G01R 31/3647 |
| | | | | 324/426 |
| 2013/0030630 | A1* | 1/2013 | Luke | H01M 10/441 |
| | | | | 701/22 |
| 2016/0221465 | A1* | 8/2016 | Kratzer | H02J 7/0013 |
| 2017/0242079 | A1* | 8/2017 | Duan | B60L 50/15 |
| 2020/0164763 | A1* | 5/2020 | Holme | B60L 58/16 |
| 2020/0353839 | A1 | 11/2020 | Tarchinski et al. | |
| 2021/0268932 | A1* | 9/2021 | Zhang | B60L 58/13 |
| 2021/0373082 | A1* | 12/2021 | Kupcsik | G01R 31/367 |
| 2022/0026492 | A1* | 1/2022 | Verheijen | H01M 10/48 |
| 2022/0065939 | A1* | 3/2022 | Senn | G06N 3/088 |
| 2022/0097561 | A1* | 3/2022 | Simonis | B60L 58/16 |
| 2022/0128631 | A1* | 4/2022 | Zhang | B60L 58/22 |
| 2022/0153166 | A1* | 5/2022 | Rangel | G01R 31/392 |
| 2022/0334190 | A1 | 10/2022 | Jobson | |
| 2023/0011148 | A1* | 1/2023 | Jeong | B60L 58/16 |
| 2023/0016228 | A1* | 1/2023 | Simonis | G01R 31/367 |
| 2023/0132491 | A1* | 5/2023 | Kang | G01R 31/3832 |
| | | | | 324/76.11 |
| 2023/0384391 | A1* | 11/2023 | Kwak | G01R 31/371 |
| 2024/0210477 | A1* | 6/2024 | Dufford | G01R 31/392 |
| 2024/0217389 | A1* | 7/2024 | Negoita | B60L 58/16 |
| 2024/0264573 | A1* | 8/2024 | Kaldobsky | G05B 19/042 |
| 2025/0044359 | A1* | 2/2025 | Wang | G01R 31/392 |
| 2025/0052820 | A1* | 2/2025 | Ozkan | G01R 31/3648 |
| 2025/0162446 | A1* | 5/2025 | Bunnell | B60L 58/16 |
| 2025/0196787 | A1* | 6/2025 | Ferone | B60R 16/0234 |

FOREIGN PATENT DOCUMENTS

| | | |
|---|---|---|
| DE | 102019125375 A1 | 3/2021 |
| KR | 102024002465 A | 1/2024 |

OTHER PUBLICATIONS

Jiahuan Lu et al., Deep learning to estimate lithium-ion battery state of health without additional degradation experiments, May 13, 2023, doi.org, pp. 1-13.*

LSTM Method, Mar. 18, 2023, doi.org, pp. 1-18.*

* cited by examiner

SYSTEMS AND METHODS FOR MONITORING A STATE OF HEALTH OF A BATTERY SYSTEM OF AN ELECTRIC VEHICLE

INTRODUCTION

The technical field generally relates to vehicles, and more particularly relates to systems and methods for monitoring a state of health (SOH) of a battery system of an electric vehicle.

Electric vehicles (EV) typically include a rechargeable energy storage system (RESS) for powering the electric components that facilitate propulsion of the EV. An example of a RESS is a battery system. The battery system may include a battery pack including one or more battery modules. Each battery module may include multiple battery cells. In addition to providing power for propulsion of the EV, the battery system may be used to power onboard accessory loads of the EV. An example of an onboard accessory load is a connected camera. The battery system may also be used to power offboard vehicle loads when the EV is stationary.

Examples of offboard vehicle loads include vehicle to grid (V2G), vehicle to home (V2H), vehicle to vehicle (V2V), vehicle to load (V2L), power take off (PTO), and electronic PTO. The offboard vehicle loads may be collectively referred to as vehicle to X (V2X) loads. The ability to supply power to V2X loads enables the EV to operate as both a mode of transportation and a power source. However, the useful life of the battery system may be affected by miles driven by the EV and use of the battery system to power onboard accessory loads and/or offboard vehicle loads. In many instances battery system warranties are based on the SOH of battery systems. The assessment of the SOH of battery systems often do not specify the impact of powering of onboard accessory loads and/or offboard vehicles loads.

Accordingly, it is desirable to provide improved methods and systems for monitoring a SOH of a battery system of an EV based on miles driven by the EV and/or vehicle age and use of the battery system to power onboard accessory loads and/or offboard vehicle loads. Other desirable features and characteristics will become apparent from the subsequent detailed description and the appended claims, taken in conjunction with the accompanying drawings and the foregoing technical field and background.

SUMMARY

In various embodiments, a battery system state of health (SOH) monitoring system for an electric vehicle (EV) includes at least one processor and at least one memory communicatively coupled to the at least one processor. The at least one memory includes instructions that upon execution by the at least one processor, cause the at least one processor to: generate a projected SOH value of a battery system of the EV at one of a future vehicle age and a future total EV mileage, wherein: the projected SOH value of the battery system is based on a current SOH value of the battery system and historical SOH values of the battery system; the current SOH value of the battery system and the historical SOH values of the battery system are based at least in part on use of the battery system to supply power to at least one of an offboard vehicle load and an onboard accessory load; determine whether the projected SOH value of the battery system is less than a SOH threshold at the one of the future vehicle age and the future total EV mileage; and generate a customer SOH alert associated with limitations in connection with the use of the battery system to supply power to the at least one of the offboard vehicle load and the onboard accessory load for display on a display device of the EV based on the determination.

In at least one embodiment, the SOH threshold is a first SOH threshold value, the at least one memory includes further instructions that upon execution by the at least one processor, cause the at least one processor to: based on a determination that the projected SOH value of the battery system is less than the first SOH threshold value: disable an ability of the battery system to supply power to all of the at least one of the offboard vehicle load and the onboard accessory load; and generate the customer SOH alert, the customer SOH alert comprising a first notification that the ability of battery system to supply power to all of the at least one of the offboard vehicle load and the onboard accessory load has been disabled.

In at least one embodiment, the SOH threshold is a first SOH threshold range between the first SOH threshold value and a second SOH threshold value. The second SOH threshold value is greater than the first SOH threshold value. Based on a determination that the projected SOH value of the battery system falls within the first SOH threshold range, the at least one memory includes further instructions that upon execution by the at least one processor, cause the at least one processor to: limit an amount of power that can be supplied by the battery system to a first subset of the at least one of the offboard vehicle load and the onboard accessory load; disable an ability of the battery system to supply power to a second subset of the at least one of the offboard vehicle load and the onboard accessory load; and generate the customer SOH alert, the customer SOH alert comprising a second notification that the amount of power that can be supplied by the battery system to the first subset of the at least one of the offboard vehicle load and the onboard accessory load has been limited and that the ability of the battery system to supply power to a second subset of the at least one of the offboard vehicle load and the onboard accessory load has been disabled.

In at least one embodiment, the SOH threshold is a second SOH threshold range between the second SOH threshold value and a third SOH threshold value. The third SOH threshold value is greater than the second SOH threshold value. Based on a determination that the projected SOH value of the battery system falls within the second SOH threshold range, the at least one memory includes further instructions that upon execution by the at least one processor, cause the at least one processor to: recommend limiting use of the battery system to supply power to the at least one of the offboard vehicle load and the onboard accessory load; limit an amount of power that can be supplied by the battery system to a third subset of the at least one of the offboard vehicle load and the onboard accessory load; and generate the customer SOH alert, the customer SOH alert comprising a third notification to recommend limiting use of the battery system to supply power to the at least one of the offboard vehicle load and the onboard accessory load and that the amount of power that can be supplied to the third subset of the at least one of the offboard vehicle load and the onboard accessory load has been limited.

In at least one embodiment, the SOH threshold is a third SOH threshold range between the third SOH threshold value and a fourth SOH threshold value. The fourth SOH threshold value is greater than the third SOH threshold value. Based on a determination that the projected SOH value of the battery system falls within the third SOH threshold range, the at least one memory includes further instructions that upon execution by the at least one processor, cause the at least one processor to generate the customer SOH alert, the customer SOH alert comprising a fourth notification to recommend limiting use of the battery system to supply power to the at least one of the offboard vehicle load and the onboard accessory load.

In at least one embodiment, the at least one memory includes further instructions that upon execution by the at least one processor, cause the at least one processor to: generate the projected SOH value of the battery system at the future vehicle age, wherein the projected SOH value of the battery system is based on the current SOH value of the battery system and historical SOH values of the battery system during corresponding historical vehicle ages; and determine whether the projected SOH value of the battery system is less than the SOH threshold at the future vehicle age.

In at least one embodiment, the at least one memory includes further instructions that upon execution by the at least one processor, cause the at least one processor to generate the projected SOH value of the battery system at the future vehicle age, wherein the projected SOH value of the battery system is based on the current SOH value of the battery system and the historical SOH values of the battery system during the corresponding historical vehicle ages within a pre-defined vehicle age window.

In at least one embodiment, the future vehicle age is a vehicle age warranty.

In at least one embodiment, the at least one memory includes further instructions that upon execution by the at least one processor, cause the at least one processor to: generate the projected SOH value of the battery system at the future total EV mileage, wherein: the projected SOH value of the battery system is based on the current SOH value of the battery system at a current total EV mileage and historical SOH values of the battery system during corresponding historical total EV mileages; each total EV mileage is a sum of a driven EV mileage and a virtual EV mileage; and each virtual EV mileage is based on the use of the battery system to supply power to the at least one of the offboard vehicle load and the onboard accessory load; and determine whether the projected SOH value of the battery system is less than the SOH threshold at the future total EV mileage.

In at least one embodiment, the at least one memory includes further instructions that upon execution by the at least one processor, cause the at least one processor to generate the projected SOH value of the battery system at the future total EV mileage, wherein the projected SOH value of the battery system is based on the current SOH value of the battery system and the historical SOH values of the battery system during the corresponding historical total EV mileages within a pre-defined total EV mileage window.

In at least one embodiment, the future total EV mileage is a vehicle warranty mileage.

In at least one embodiment, the at least one memory includes further instructions that upon execution by the at least one processor, cause the at least one processor to: determine the current battery SOH value of the battery system; determine a current vehicle age; determine a current total EV mileage, wherein the current total EV mileage is a sum of a current driven EV mileage and a current virtual EV mileage, and the current virtual EV mileage is based on the use of the battery system to supply power to the at least one of the offboard vehicle load and the onboard accessory load; and identify the SOH threshold associated with the current battery SOH value, the current vehicle age, and the current total EV mileage using pre-defined relationships between battery SOH values, vehicle ages, total EV mileages, and battery SOH thresholds.

In at least one embodiment, the at least one memory includes further instructions that upon execution by the at least one processor, cause the at least one processor to: generate a first projected SOH value of the battery system at the future vehicle age, wherein the first projected SOH value of the battery system is based on the current SOH value of the battery system and historical SOH values of the battery system during corresponding historical vehicle ages; generate a second projected SOH value of the battery system at the future total EV mileage wherein: the second projected SOH value of the battery system is based on the current SOH value of the battery system at a current total EV mileage and historical SOH values of the battery system during corresponding historical total EV mileages; each total EV mileage is a sum of a driven EV mileage and a virtual EV mileage; and each virtual EV mileage is based on the use of the battery system to supply power to the at least one of the offboard vehicle load and the onboard accessory load; and determine whether both the first projected SOH value and the second projected SOH value are less than the SOH threshold; and generate the customer SOH alert based on the determination.

In at least one embodiment, the at least one memory includes further instructions that upon execution by the at least one processor, cause the at least one processor to: generate the projected SOH value of the battery system of the EV the at one of a future vehicle age and the future total EV mileage, wherein: the projected SOH value of the battery system is based on the current SOH value of the battery system and the historical SOH values of the battery system; and the current SOH value of the battery system and the historical SOH values of the battery system are based at least in part on use of the battery system to supply power to at least one of an offboard vehicle load and an onboard accessory load; generate another projected SOH value of the battery system of the EV the at one of the future vehicle age and the future total EV mileage, wherein the another projected SOH value of the battery system is based on discontinuation of the use of the battery system to supply power to the at least one of the offboard vehicle load and the onboard accessory load; determine whether the projected SOH value is less than the SOH threshold and the another projected SOH value is greater than the SOH threshold; and generate the customer SOH alert based on the determination.

In at least one embodiment, the onboard accessory load is a connected camera system.

In at least one embodiment, the offboard vehicle load includes at least one of a vehicle to grid (V2G), vehicle to home (V2H), vehicle to vehicle (V2V), vehicle to load (V2L), power take off (PTO), and electronic PTO.

In various embodiments, a method for monitoring a state of health (SOH) of a battery system of an electric vehicle (EV) includes: generating a projected SOH value of a battery system of the EV at one of a future vehicle age and a future total EV mileage, wherein: the projected SOH value of the battery system is based on a current SOH value of the battery system and historical SOH values of the battery system; the current SOH value of the battery system and the historical SOH values of the battery system are based at least in part on use of the battery system to supply power to at least one of an offboard vehicle load and an onboard accessory load; determining whether the projected SOH value of the battery system is less than a SOH threshold at the one of the future vehicle age and the future total EV mileage; and generating a customer SOH alert associated with limitations in connection with the use of the battery system to supply power to the at least one of the offboard vehicle load and the onboard accessory load for display on a display device of the EV based on the determination.

In at least one embodiment, the method includes: generating the projected SOH value of the battery system at the future total EV mileage, wherein: the projected SOH value of the battery system is based on the current SOH value of the battery system at a current total EV mileage and historical SOH values of the battery system during corresponding historical total EV mileages; each total EV mileage is a sum of a driven EV mileage and a virtual EV mileage; and each virtual EV mileage is based on the use of the battery system to supply power to the at least one of the offboard vehicle load and the onboard accessory load; and determining whether the projected SOH value of the battery system is less than the SOH threshold at the future total EV mileage.

In at least one embodiment, the method further includes generating the projected SOH value of the battery system at the future vehicle age, wherein the projected SOH value of the battery system is based on the current SOH value of the battery system and historical SOH values of the battery system during corresponding historical vehicle ages; and determining whether the projected SOH value of the battery system is less than the SOH threshold at the future vehicle age.

In various embodiments, an electric vehicle (EV) includes at least one processor; and at least one memory communicatively coupled to the at least one processor. The at least one memory includes instructions that upon execution by the at least one processor, cause the at least one processor to: generate a projected SOH value of a battery system of the EV at one of a future vehicle age and a future total EV mileage, wherein: the projected SOH value of the battery system is based on a current SOH value of the battery system and historical SOH values of the battery system; the current SOH value of the battery system and the historical SOH values of the battery system are based at least in part on use of the battery system to supply power to at least one of an offboard vehicle load and an onboard accessory load; determine whether the projected SOH value of the battery system is less than a SOH threshold at the one of the future vehicle age and the future total EV mileage; and generate a customer SOH alert associated with limitations in connection with the use of the battery system to supply power to the at least one of the offboard vehicle load and the onboard accessory load for display on a display device of the EV based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
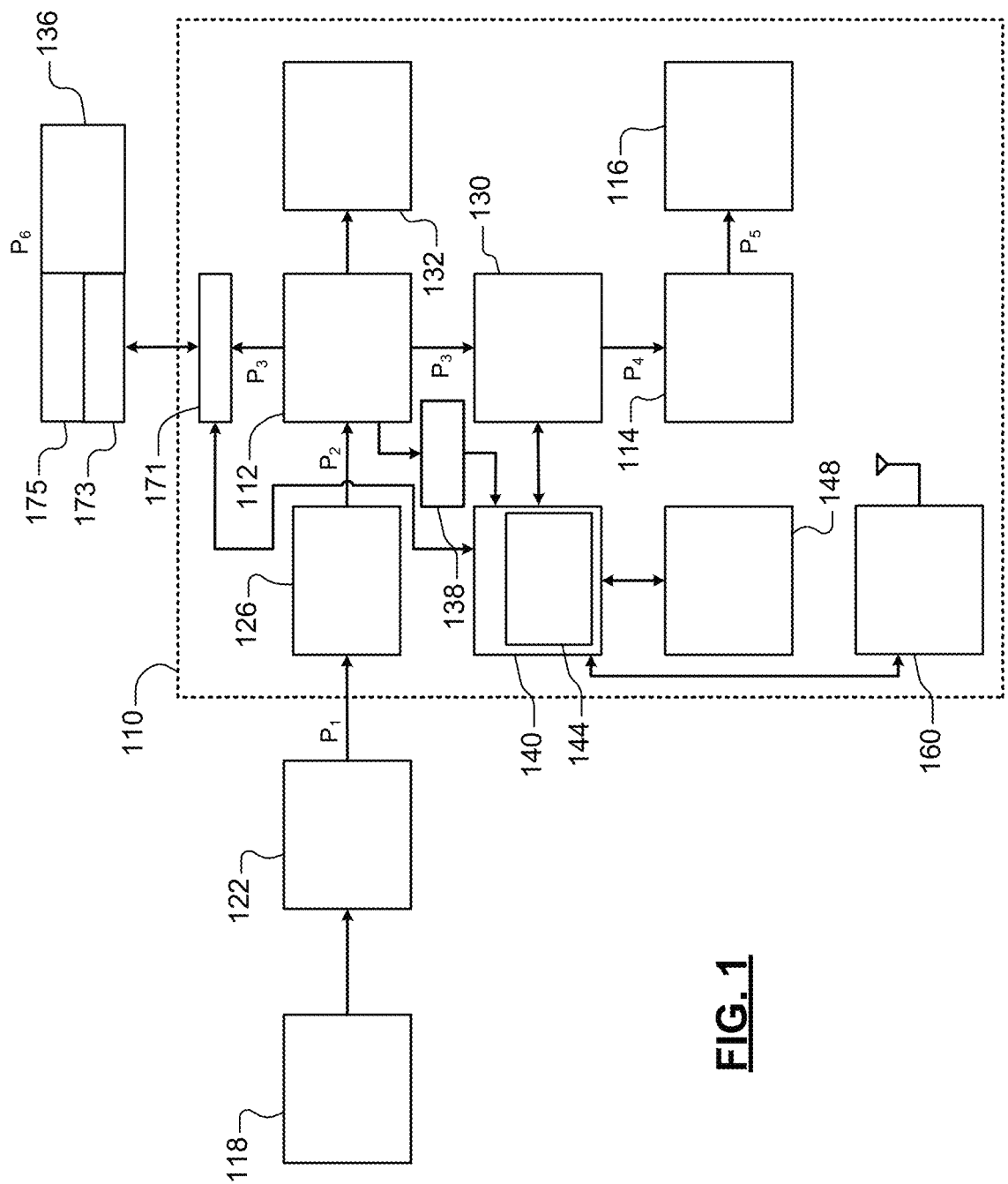
FIG. 1 is a functional block diagram of a system including an electric vehicle (EV) including a battery system state of health (SOH) monitoring system in accordance with at least one embodiment.

Referring to FIG. 1, a functional block diagram of a system including an electric vehicle (EV) 110 including a battery system state of health (SOH) monitoring system 144 in accordance with at least one embodiment is shown. The EV 110 includes a battery system 112. An example of a battery system 112 is a battery pack such as a high voltage (HV) battery. The EV 110 includes a powertrain 114 including an electric motor, a gearbox, and/or a differential to propel one or more wheels 116 of the EV 110. A utility 118 or other power source supplies power to electric vehicle supply equipment (EVSE) 122. In various embodiments, the EVSE 122 supplies power from the utility 118 to an onboard charging module (OBCM) 126 that controls charging of the battery system 112. In various embodiments, direct current (DC) fast charging (DCFC) is used and the OBCM 126 is bypassed.

During driving, the battery system 112 supplies power through a power inverter module 130 to the powertrain 114 to propel one or more wheels 116 of the EV 110. The battery system 112 also supplies power to onboard accessory loads 132. In at least one embodiment, the battery system 112 can also be used to supply power to offboard vehicle loads 136 (also referred to as V2X components or V2X loads). Examples of offboard vehicle loads 136 include, but are not limited to, vehicle to grid (V2G), vehicle to home (V2H), vehicle to vehicle (V2V), vehicle to load (V2L), a power take off (PTO), and an electric PTO. The EV 110 can operate as both a power source and a mode of transportation. Onboard accessory loads 132 can be referred to collectively as onboard accessory load 132. Offboard vehicle loads 136 can be referred to collectively as offboard vehicle load 136, One or more sensors 138 such as current and/or voltage sensors sense power output by the battery system 112 to the powertrain 114, the onboard accessory loads 132, and/or offboard vehicle loads 136. In various embodiments, a controller 140 includes a battery system SOH monitoring system 144. The battery system SOH monitoring system 144 monitors a SOH of the battery system 112. In various embodiments, the controller 140 includes a virtual odometer to calculate a virtual distance and/or a total distance. In at least one embodiment, the battery system SOH monitoring system 144 includes a virtual odometer to calculate a virtual distance and/or a total distance. The controller 140 receives output(s) from the one or more sensors 138.

An interface 148 includes a display and input device (such as buttons or touch screen) such as a dashboard display or infotainment display. The display displays customer SOH alerts, battery system SOH data, and notifications associated with the SOH of the battery system 112. The interface 148 allows a customer to change settings controlling the power supplied to the offboard vehicle loads 136 and/or the onboard accessory loads 132. An example of an onboard accessory load 132 is a connected camera system. In various embodiments, the interface 148 enables a customer to selectively inactivate, restrict, or disable the EV 110 from supplying power to offboard vehicle loads 136 and/or onboard accessory loads 132. A telematics system 160 may be used to wirelessly communicate with a remote server to exchange information associated with the SOH of the battery system 112, warranty information associated with the battery system 112 with a manufacturer, and/or setting changes, restrictions, and/or manufacturer recommendations.

In various embodiments, a customer SOH alert is provided via the interface 148 recommending limiting the use of the battery system 112 to power offboard vehicle loads 136 and/or onboard accessory loads 132 when the battery system SOH monitoring system 144 determines that the SOH of the battery system 112 is degrading at a rate that will potentially void a warranty associated with the battery system 112. In various embodiments, a disable option is provided via the interface 148 to disable the ability of the battery system 112 to supply power output to offboard vehicle loads 136 and/or onboard accessory loads 132 when the battery system SOH monitoring system 144 determines that the SOH of the battery system 112 is degrading at a rate that will potentially void a warranty associated with the battery system 112. In various embodiments, the ability to use the battery system 112 to supply power to offboard vehicle loads 136 and/or onboard accessory loads 132 is automatically disabled when the battery system SOH monitoring system 144 determines that the SOH of the battery system 112 is degrading at a rate that will potentially void a warranty associated with the battery system 112.

In various embodiments, the EV 110 includes a vehicle V2X interface 171 configured to exchange information with an external V2X interface 173 of the offboard vehicle loads 136. In various embodiments, a power converter 175 converts power output by the battery system 112 for use by the offboard vehicle loads 136. In various embodiments, the power converter 175 is arranged on a vehicle side of the EV 110. In various embodiments, the exchanged information include an identification of a type of an offboard vehicle load 136, power needed, and/or other information. The controller 140 and the interface 148 are configured to set an active/inactive state for supplying power from the battery system 112 to various types of offboard vehicle loads 136 and/or to set limits on the power supplied within a predetermined period (e.g. one or more hours, days, weeks, months, years, other period). In various embodiments, the manufacturer can override customer settings associated with the battery system 112 based on the SOH of the battery system 112 and/or provide recommendations that can be used as a default or selected by the customer.

Figure 2A:
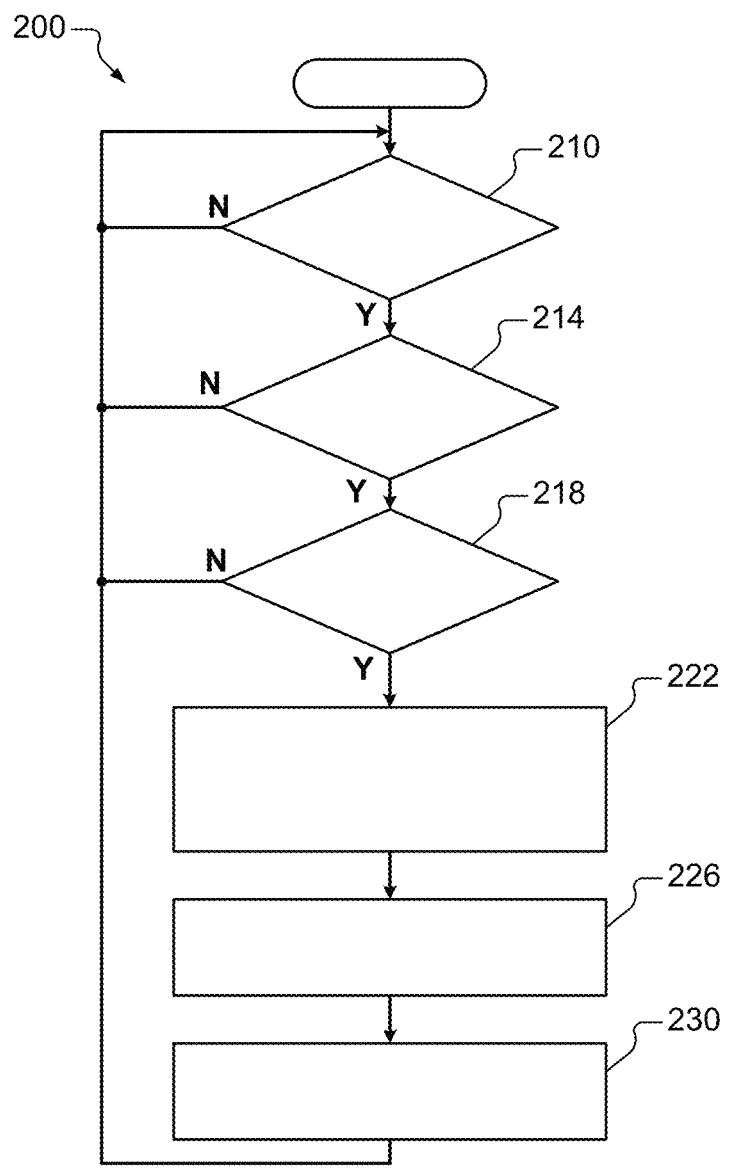
FIGS. 2A to 2I are examples of methods for estimating virtual EV mileages corresponding to power supplied to offboard vehicle loads and/or onboard accessory loads in accordance with various embodiments.

Referring now to FIGS. 2A to 2I, examples of methods for estimating virtual EV mileages corresponding to power supplied to offboard vehicle loads 136 and/or onboard accessory loads 132 in accordance with various embodiments is shown. In various embodiments, the virtual EV mileage is generated by the battery system SOH monitoring system 144. The virtual EV mileage may also be referred to as a virtual distance or a virtual odometer. Referring to FIG. 2A, a method 200 for providing a virtual odometer in accordance with at least one embodiment shown. At 210, a determination is made regarding whether supplying power to offboard vehicle loads 136 is active. If supplying power to offboard vehicle loads 136 is determined to not be active at 210, the method 200 returns to 210. If supplying power to offboard vehicle loads 136 is determined to be active at 210, a determination is made regarding whether a speed of the EV 110 is zero at 214.

If the speed of the EV 110 is determined to not be zero at 214, the method returns to 210. If the speed of the EV 110 is determined to be zero at 214, a determination is made regarding whether the battery system 112 is in a net discharge state (supplying more power than it is receiving) at 218. The charging may be performed via a direct connection to the EV 110 and/or using wireless charging. The EV 110 may supply power to offboard vehicle loads 136 and/or onboard accessory loads 132. An example of an onboard accessory load 132 includes a connected camera system.

If a determination is made that the battery system 112 is not in a net discharge state at 218, the method returns to 210. If a determination is made that the battery system 112 is in a net discharge state at 218, the net power supplied by the battery system 112 to loads is integrated as measured at the battery system 112 at 222. The loads include offboard vehicle loads 136 and/or onboard accessory loads 132. At 226, the integrated net power is converted into a virtual EV mileage as will be described further below. At 230, the virtual EV mileage is added to the prior virtual EV mileage to generate an updated total virtual EV mileage. The updated total virtual EV mileage is used to update the prior total EV mileage. A total EV mileage includes the virtual EV mileage and a driven EV mileage.

At 222, all loads on battery system 112 including any plug-in charge or wireless charge additions) are included. While net discharging, all loads on the battery system 112 (measuring voltage and current at the battery system 112) are included. For example, if the EV 110 is plug-in charging at 10 kW but outputting 25 kW to ePTO and 5 kW to onboard accessory loads 132, the net will be 20 kW discharge and will be considered in the integrated power total in 222. If the EV starts net charging (example: plug in charge at 50 KW, ePTO at 25 kw, onboard accessory loads 132 at 5 kW), the V2X energy calculation is paused.

Figure 2C:
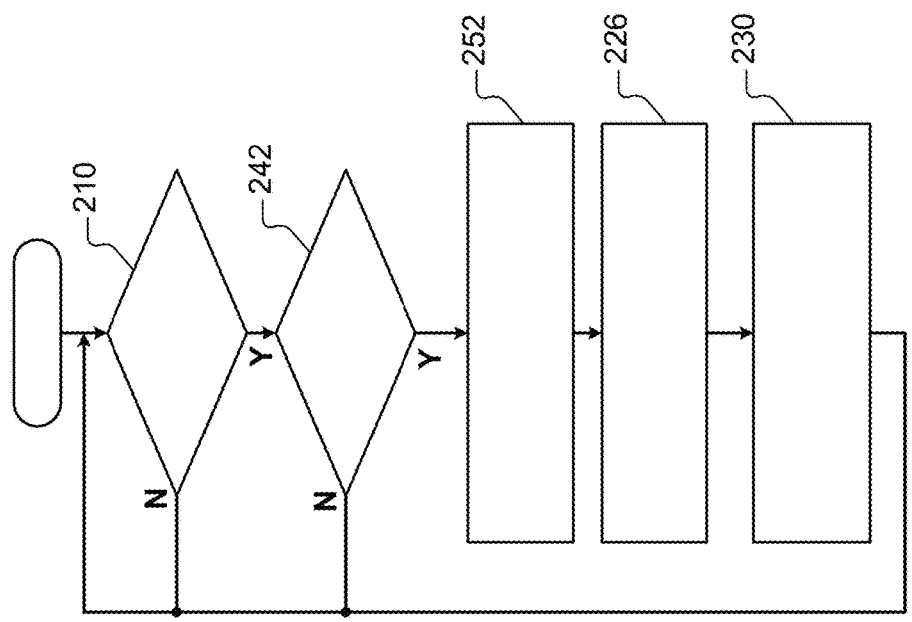
Figure 2B:
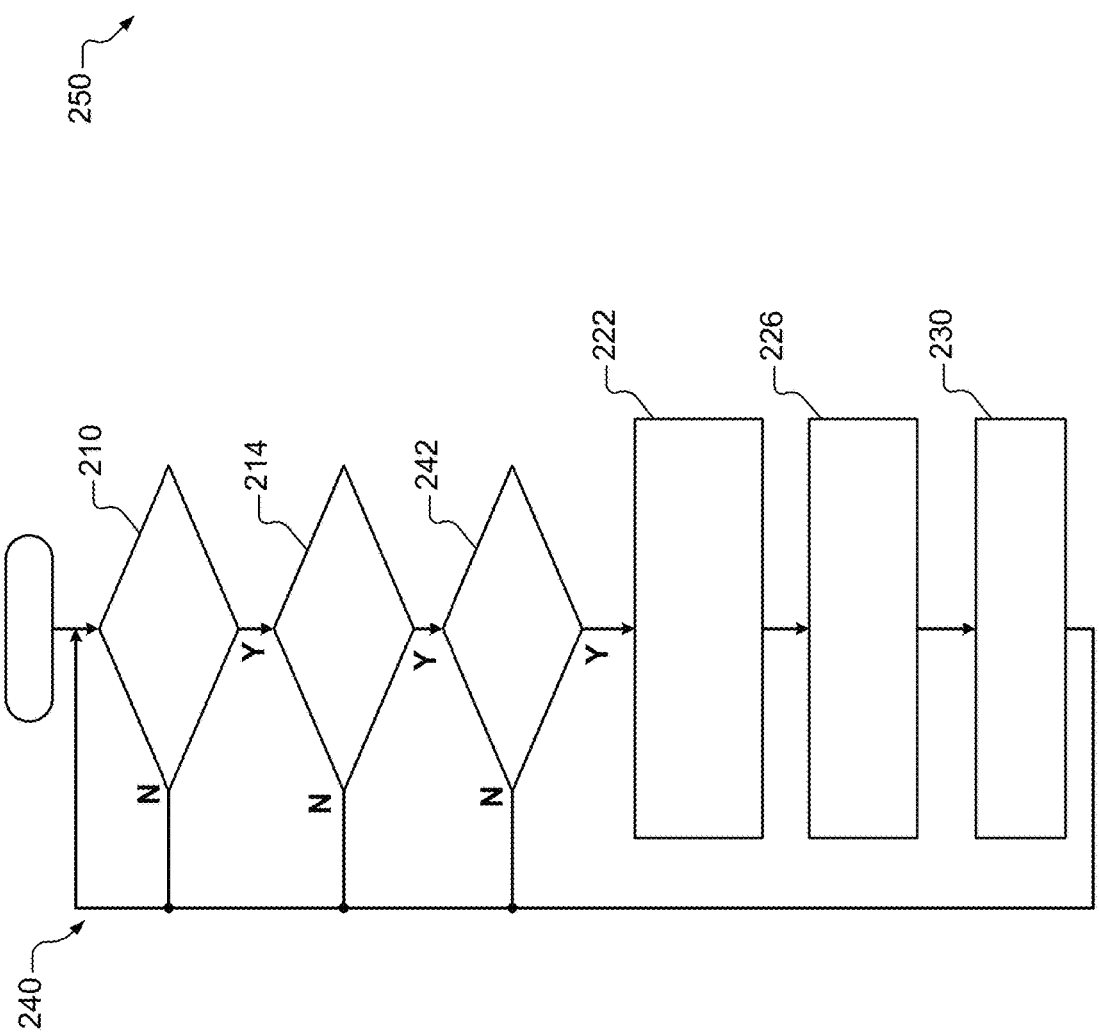

Referring to FIG. 2B, a method 240 integrates net power supplied by the battery system 112 as measured at the battery system 112 except when the battery system 112 is plug-in or wirelessly charging in accordance with at least one embodiment. Similar to method 200, a determination is made regarding whether V2X is active at 210 and whether the speed of the EV 110 is zero at 214. At 242, a determination is made regarding whether the EV 110 is not plug-in or wirelessly charging. If 210, 214 and 242 are determined to be true, the method 240 continues with 222, 226 and 230 as described above with reference to method 200. At 242, if a determination is made that the EV 110 is plug-in or wirelessly charging, the method returns to 210.

Referring to FIG. 2C, the method 250 integrates net power supplied by the battery system 112 as measured at the battery system 112 except when the battery system is plug-in or wirelessly charging in accordance with at least one embodiment. Similar to the method 240, a determination is made regarding whether V2X is active at 210 and whether the EV 110 is not plug-in or wirelessly charging at 242. If 210 and 242 are determined to be true, the method 250 integrates net power supplied by the battery system 112 to offboard vehicle loads 136 and onboard accessory loads 132 at 252 prior to performing 226 and 230 as described above with reference to method 240.

Figure 2E:
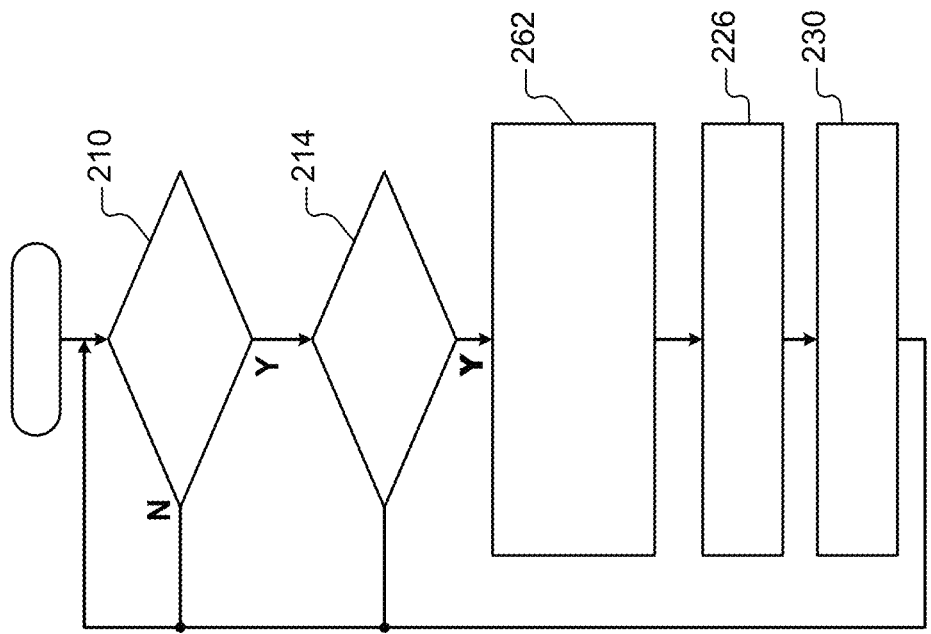
Figure 2D:
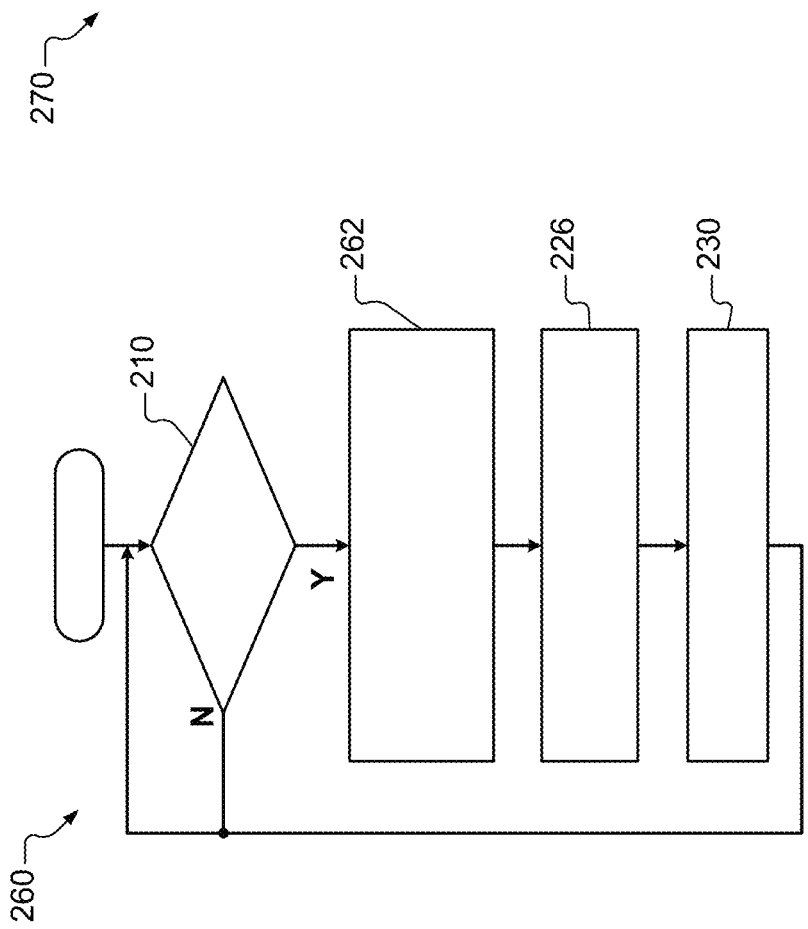

Referring to FIG. 2D, a method 260 measures power output by the battery system 112 at an interface to the offboard vehicle loads 136 (power supplied to onboard accessory loads 132 is not included) in accordance with at least one embodiment. Similar to method 250, a determination is made regarding whether V2X is active at 210. If 210 is true, the method 260 integrates net power supplied to offboard vehicle loads 136 at 262. After performing 262, the method 260 performs 226 and 230 as described above with reference to method 250.

Referring to FIG. 2E, a method 270 measures power output by the battery system 112 at the interface to the offboard vehicle loads 136 (power supplied to onboard accessory loads 132 is not included) in accordance with at least one embodiment. Similar to method 200, a determination is made regarding whether V2X is active at 210 and a speed of the EV 110 is zero at 214. If 210 and 214 are true, the method 270 integrates net power supplied to the offboard vehicle loads 136 at 262 as described with reference to method 260. After performing 262, the method 270 performs 226 and 230 as described above with reference to method 260.

Figure 2G:
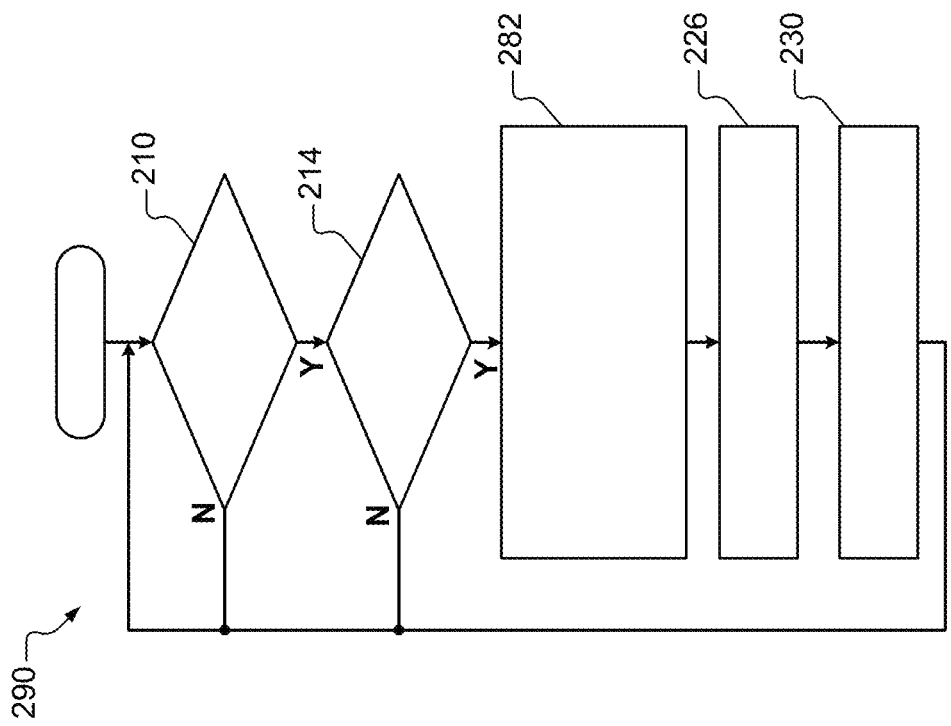
Figure 2F:
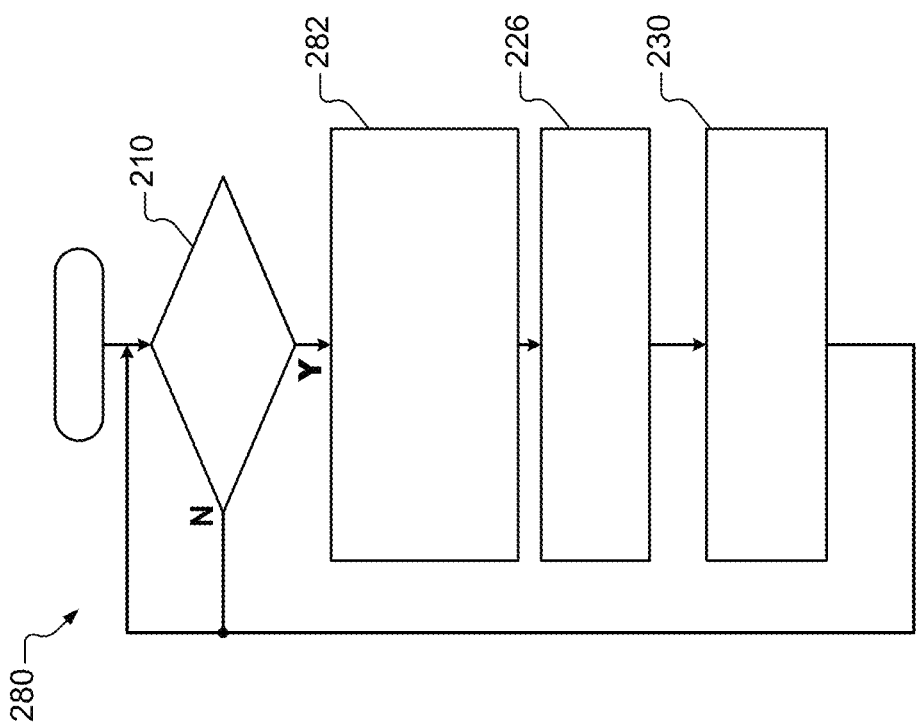

Referring to FIG. 2F, a method 280 measures power output by the battery system 112 at the interface to the offboard vehicle loads 136 and a predetermined static onboard accessory load is added but not directly measured in accordance with at least one embodiment. Similar to method 200, a determination is made regarding whether V2X is active at 210. If 210 is true, the method 280 integrates net power supplied to the offboard vehicle loads 136 and uses a predetermined or assumed static onboard accessory load to support 12V/48V (or other onboard accessory voltage level) power consumption and thermal conditioning at 282. After performing 282, the method 280 performs 226 and 230 as described above with reference to method 260.

Referring to FIG. 2G, a method 290 measures power output by the battery system 112 at the interface to the offboard vehicle loads 136 and a predetermined static onboard accessory load is added but not directly measured in accordance with at least one embodiment. Similar to method 200, a determination is made regarding whether V2X is active at 210 and vehicle speed is zero at 214. If 210 and 214 are true, the method 290 integrates net power supplied to the offboard vehicle loads 136 and assumes a predetermined or assumed static onboard accessory load to support 12V (or other onboard accessory voltage level) power consumption and thermal conditioning at 282. After performing 282, the method 280 performs 226 and 230 as described above with reference to method 260.

Figure 2I:
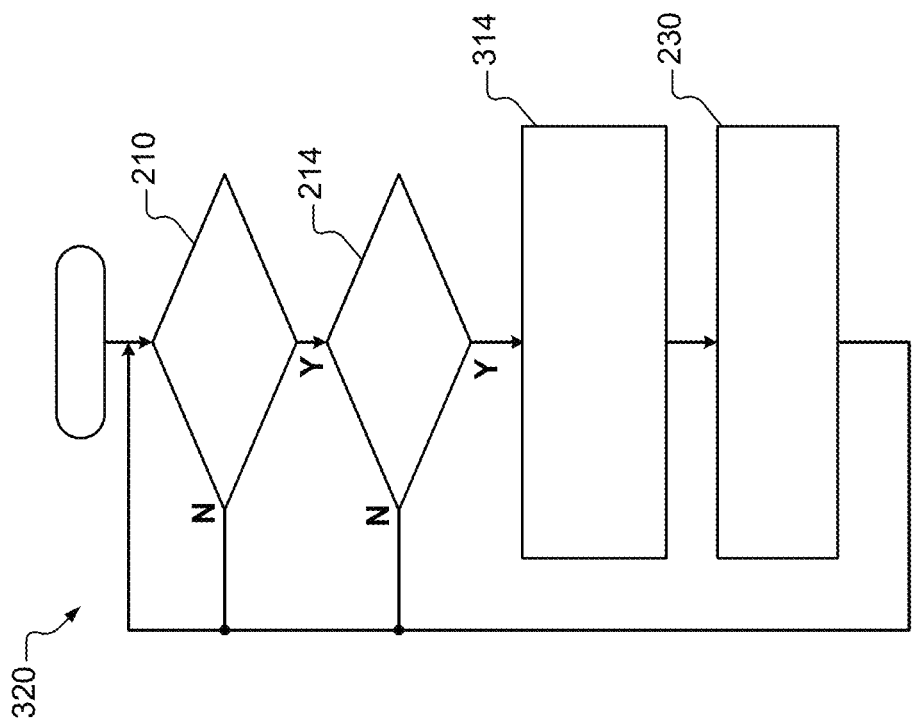
Figure 2H:
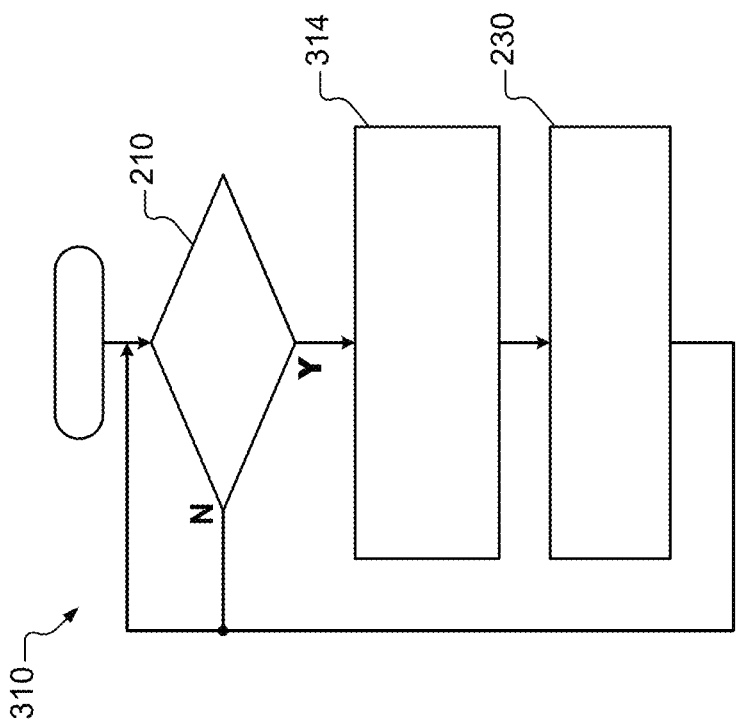

Referring now to FIG. 2H, similar to method 200, a method 310 determines whether V2X is active at 210. If 210 is true, the method 310 continues at 314 and tracks run time for each of the offboard vehicle loads 136 and converts the corresponding run times to corresponding virtual EV mileages. For example, 1 hour of runtime for an offboard V2Xi load corresponds to Xi virtual EV mileage. For example, 1 hour of runtime for a first offboard $V2X_1$ load may correspond to 25 kilometers of virtual EV mileage. For example, 1 hour of runtime for a second offboard $V2X_2$ load may correspond to 52 kilometers of virtual EV mileage. For example, 1 hour of runtime for a third offboard $V2X_3$ load may correspond to 99 kilometers of virtual EV mileage and so on. The actual run times are multiplied by the distance per hour of runtime to determine a corresponding virtual EV mileage. After performing 314, the method 310 performs 230 as described above with reference to method 290.

Referring now to FIG. 2I, similar to method 200, a method 320 determines whether V2X is active at 210 and speed of the EV 110 is zero at 214. If 210 and 214 are true, the method 320 continues at 314 and tracks run time for each of the offboard vehicle loads 136 and translates the corresponding run times to corresponding virtual EV mileages. The virtual EV mileages for each of the offboard vehicle loads 136 is summed to generate a total virtual EV mileage. After performing 314, the method 310 performs 230 as described above with reference to method 290.

Figure 3:
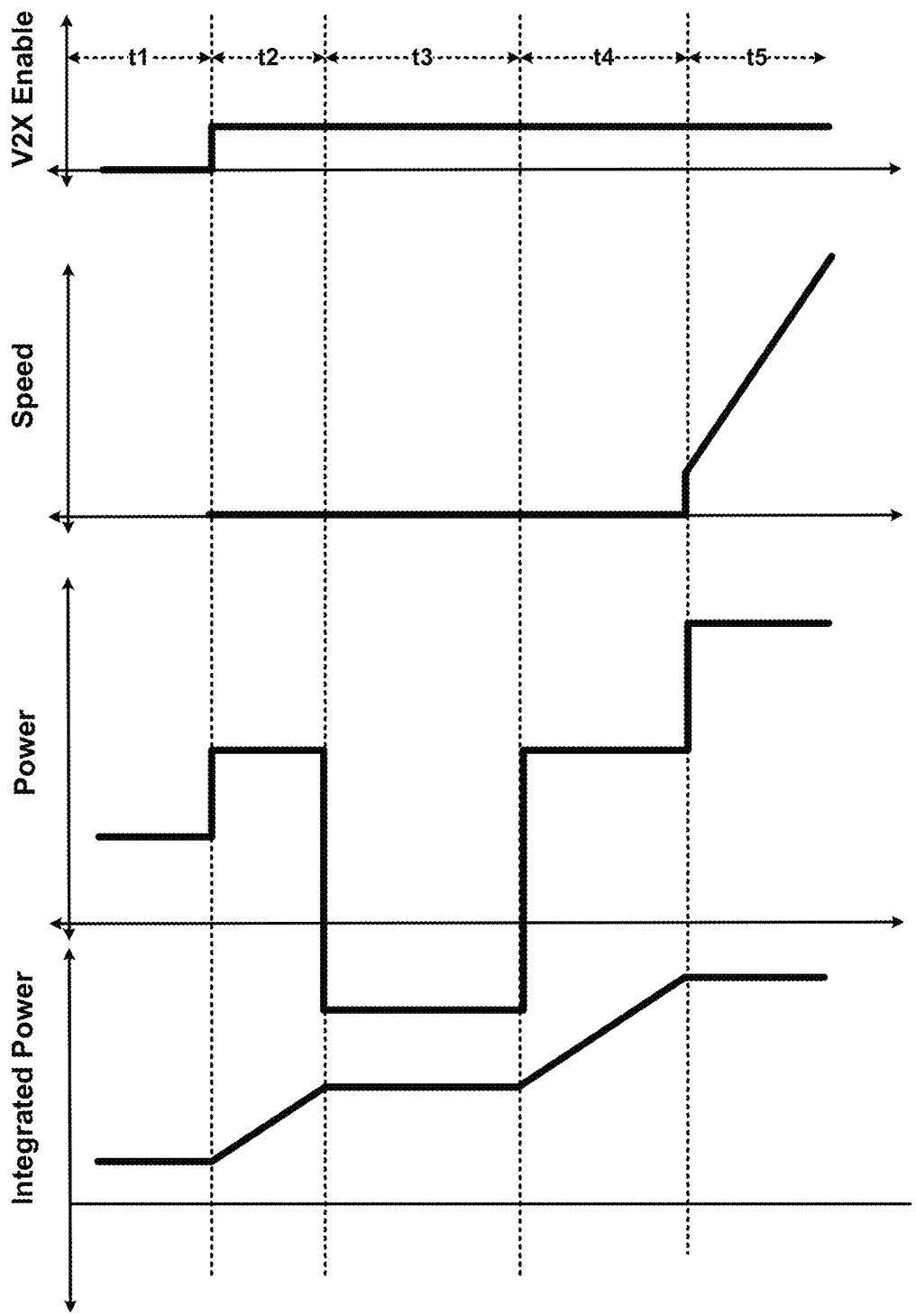
FIG. 3 is an example illustrating integration of virtual power supplied to offboard vehicle loads in accordance with at least one embodiment.

Referring now to FIG. 3, an example illustrating integration of power supplied to offboard vehicle loads 136 in accordance with at least one embodiment is shown. During a first period t1, supplying power to offboard vehicle loads 136 is inactive. During a second period t2 through a fifth period t5, supplying power to offboard vehicle loads 136 is active. During the second period t2, the speed of the EV 110 is zero and the power output by the battery system 112 to offboard vehicle loads 136 is integrated and the integrated power increases while the battery system 112 is net discharging. During a third period t3, the battery system 112 is net charging and therefore power output by the battery system 112 is not integrated (e.g., integrated power remains constant). During a fourth period t4, the battery system 112 is net discharging and the power output by the battery system 112 is integrated and integrated power increases. During the fifth period t5, the speed of the EV 110 is greater than zero and therefore the power output of the battery system 112 is not integrated.

Figure 4:
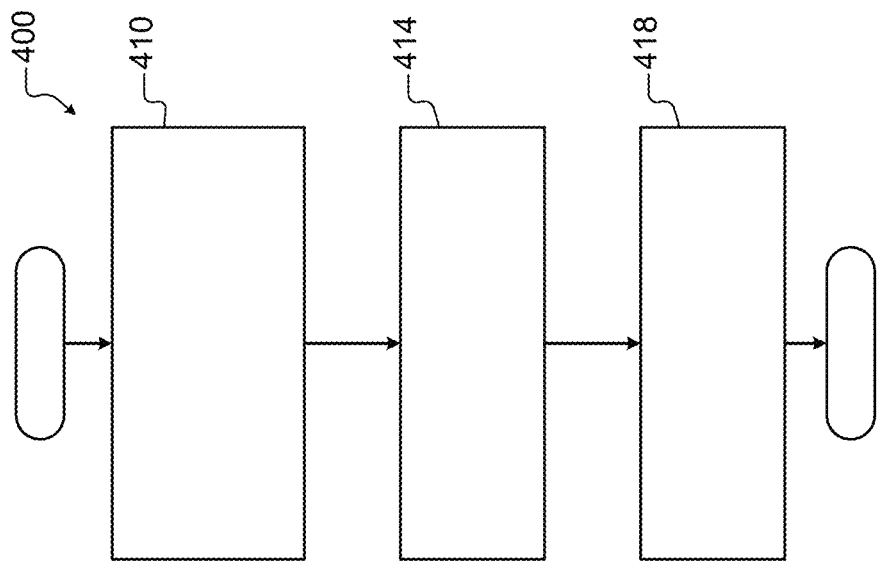
FIG. 4 is an example of a method for estimating a virtual EV mileage in accordance with at least one embodiment.

Referring to FIG. 4, an example of a method 400 for estimating virtual EV mileage in accordance with at least one embodiment is shown. At 410, a virtual odometer consumption is calculated based on certified energy consumption, useable battery energy (UBE) measured at certification, and wall energy measured at certification. In some examples, the virtual odometer consumption (kilowatt hours per kilometer (kWh/km)) is calculated as follows: (Certified Energy Consumption*UBE Measured at Certification)/Wall Energy Measured at Certification.

Certified energy consumption, UBE measured at certification, and wall energy measured at certification are known values that are determined at the time of certification of the EV 110. Using these values helps to ensure a more level playing field across manufacturers and allows comparison shopping to occur by using publicly available information. Furthermore, EVs with lower certified energy consumption will have lower virtual EV mileages for the same integrated V2X power and vice versa.

At 414, a virtual odometer value is calculated based on lifetime V2X discharge energy and virtual odometer consumption. In some examples, the virtual odometer value (km) is calculated as follows: UF*(Lifetime V2X Discharge Energy/Virtual Odometer Consumption).

In some examples, a utility factor (UF) is used. The UF can be set to 1 or another value to adjust the calculation. The UF is a function of historical V2X power. Higher V2X power is more damaging and would correspond to higher UF values (and vice versa). For example, UF may be generated by a calibration table, a continuous function, and/or a discrete function in response to lifetime average V2X power load.

At 418, the virtual odometer value is optionally added to the driven EV mileage to generate the total EV mileage. The virtual odometer value may also be referred to as virtual EV mileage.

In other examples, i values of the virtual odometer value (km) are calculated for i different offboard vehicle loads 136 (where i is an integer) as follows: $UF_i$*(Lifetime V2X discharge Energy/Virtual Odometer Consumption). In other words, each of the values of i corresponds to a V2X application such as V2G, V2V, V2L, etc. and there are a total of N offboard vehicle loads (V2X loads) 136. The N virtual odometer totals are summed to generate the total virtual odometer.

Figure 5:
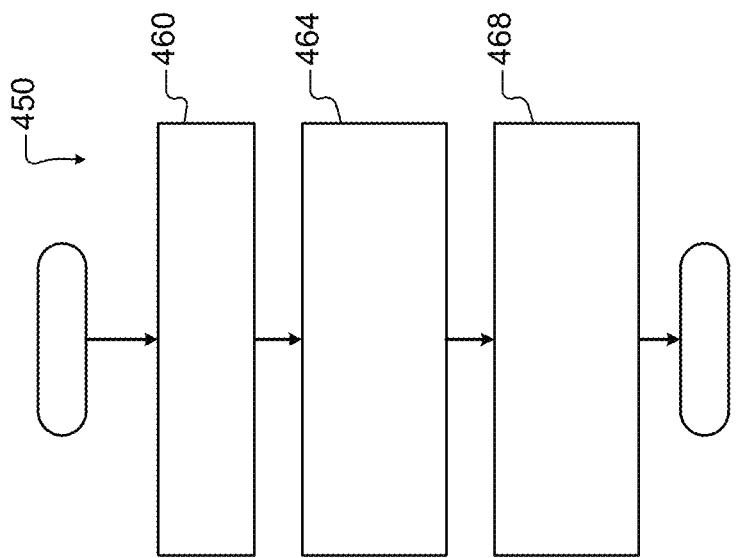
FIG. 5 is an example of a method for using the virtual EV mileage to manage vehicle warranty, service and/or powering of offboard vehicle loads in accordance with at least one embodiment.

Referring to FIG. 5, an example of a method 450 for using the virtual EV mileage to manage warranty, service and/or powering of offboard vehicle loads 136 in accordance with at least one embodiment is shown. At 460, the virtual EV mileages as defined by the virtual odometer and/or total EV mileage is transmitted via the telematics system to the manufacturer. At 464, the maintenance interval is set based on the virtual EV mileage and/or the total EV mileage. For example, maintenance may include changing coolant used to cool the battery system 112. At 468 the manufacturer may optionally restrict or disable powering offboard vehicle loads 136 in response to the virtual EV mileage and/or the total EV mileage. The manufacturer may optionally restrict or disable powering offboard vehicle loads 136 based on a current SOH of the battery system 112, a projected SOH of the battery system 112 at a future odometer value (future EV mileage), or a projected SOH of the battery system 112 at a future vehicle age. The manufacturer or customer may also optionally restrict or disable powering offboard vehicle loads 136 to reserve a certain amount of energy for propulsion. (For example: construction worker who needs to drive home from a job site may need some reserved energy to make it home)

If the virtual EV mileage and/or the total EV mileage is too high, the manufacturer can suggest maintenance. If the virtual EV mileage and/or the total EV mileage is too high, the manufacturer can send an electronic message offering an extended warranty and/or send a prerecorded message or contact the customer directly via the telematics system or through another communications channel. The manufacturer can limit supplying power to offboard vehicle loads 136 by restricting peak power or current available for supplying offboard vehicle loads 136, restrict all offboard vehicle load powering functionality, restricting supplying power to one or more types of offboard vehicle loads 136 (e.g., V2L, V2V, V2G, . . . ), display warnings to the customer on wear and tear from V2X, limit peak DCFC current to help offset excess wear and tear from V2X, limit peak propulsion current to help offset the excess wear and tear from usage powering offboard vehicle loads 136, limit peak AC charging current to help offset the excess wear and tear from usage powering offboard vehicle loads 136.

In other examples, the manufacturer may send a message to the owner to offer an extended warranty for additional payment to allow V2X to continue. In still other examples, the manufacturer may send messages to the owner indicating that V2X is counted against the warranty.

The customer is informed by virtual odometer metrics displayed on the center stack or instrument panel. By calculating the virtual odometer (virtual EV mileage), more appropriate resale values will be employed for used EVs 110. This, in turn, will lead to higher consumer confidence when buying a used EV 110 by having a comprehensive estimate of past propulsion and V2X usage. In some examples, warranty can be tied to the virtual EV mileage using units that are more familiar to customers (e.g., odometer distance such as miles or kilometers). In addition, there is less risk to manufacturers when V2X usage is considered in warranty situations. Lowering the risk will increase the likelihood of adoption of V2X capability across the industry. This will also prevent the need for manufacturers to overdesign for worst case or excessive V2X usage (with a corresponding increase in vehicle cost).

Figure 6:
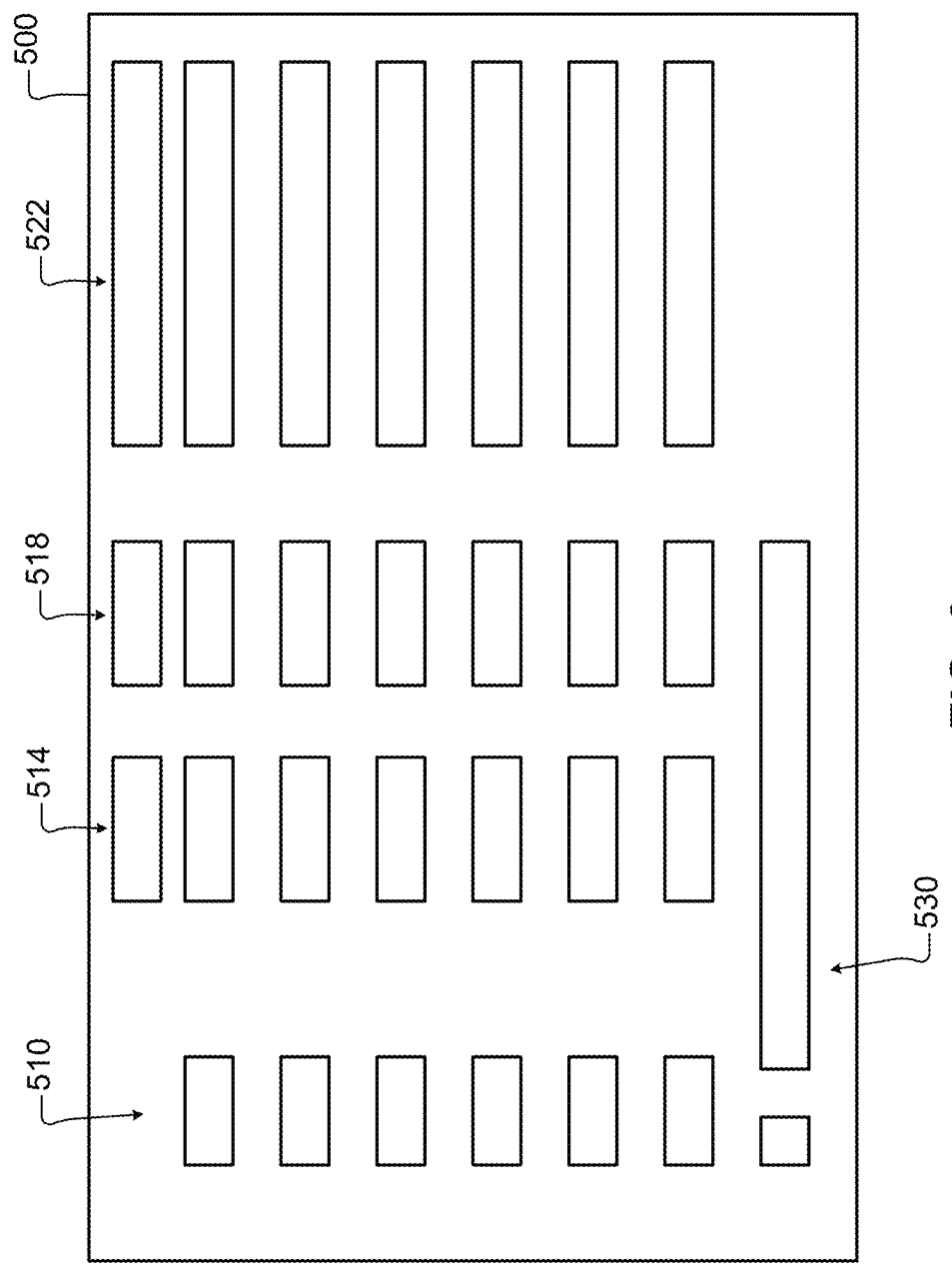
FIG. 6 illustrates an example of an interface for controlling power supplied to various offboard vehicle loads in accordance with at least one embodiment.

Referring now to FIG. 6, a display interface 500 that can be accessed by the customer via the infotainment system, instrument panel or other device for setting an active/inactive state for supplying power to an offboard vehicle load 136 is shown. The display interface 500 allows the customer to select and adjust the offboard vehicle load 510, active/inactive states 514 for the offboard vehicle loads 510, and/or daily power limits 518 for each of the offboard vehicle loads 136. In some examples, the manufacturer's recommended limits for each of the offboard vehicle loads at 522 are provided. In some examples, a customer can select the manufacturer's recommended daily limits using an input 530 such as a check box. Furthermore, the manufacturer can override a user selection by disabling the selectable active/inactive states 514 for the offboard vehicle loads 510 and/or set other daily power limits 518 for each of the offboard vehicle loads remotely based on SOH of the battery system 112, projected SOH of the battery system 112, the total EV mileage, the virtual EV mileage, and/or the driven EV mileage.

Figure 7:
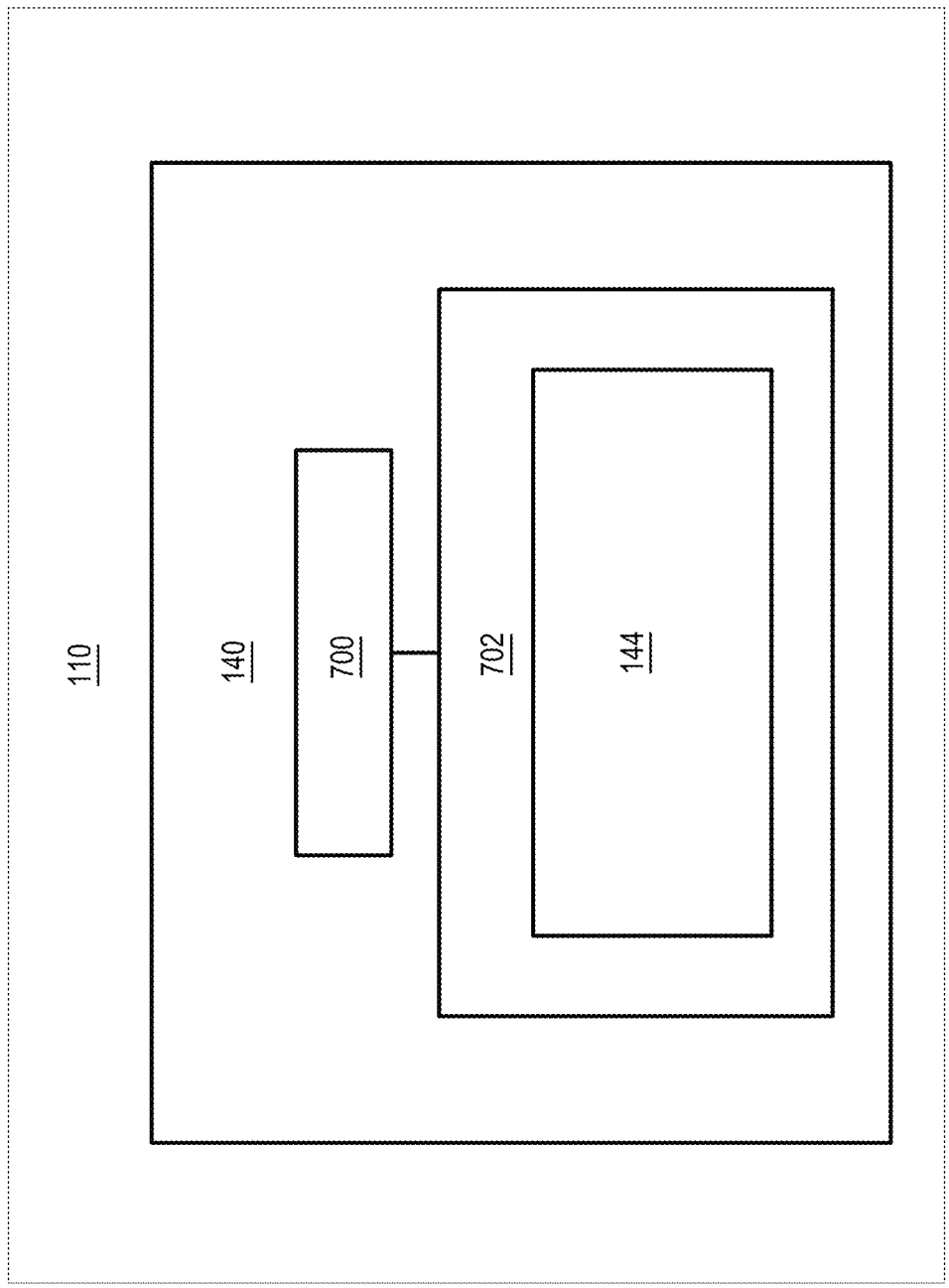
FIG. 7 is a functional block diagram of an EV including a battery system SOH monitoring system in accordance with at least one embodiment.

Referring to FIG. 7, a functional block diagram of an EV 110 including a battery system state of health (SOH) monitoring system 144 in accordance with at least one embodiment is shown. The EV 110 includes a controller 140. The controller 140 includes at least one processor 700, at least one memory 702. The at least one processor 700 is communicatively coupled to the at least one memory 702. The at least one processor 700 is a programmable device that includes one or more instructions stored in or associated with the at least one memory 702. The at least one memory 702 includes instructions that the processor(s) 700 is configured to execute.

The at least one memory 702 is a computer readable storage device or media. The at least one processor 700 can be any custom made or commercially available processor, a central processing unit (CPU), a graphics processing unit (GPU), an auxiliary processor among several processors, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor(s) 700 is powered down. The computer-readable storage device or media may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the battery system SOH monitoring system 144. The instructions may include one or more separate programs, each of which includes an ordered listing of executable instructions for implementing logical functions. The instructions, when executed by the processor(s) 700 perform logic, calculations, methods and/or algorithms for implementing the monitoring of the SOH of the battery system 112 of the EV 110.

Figure 8:
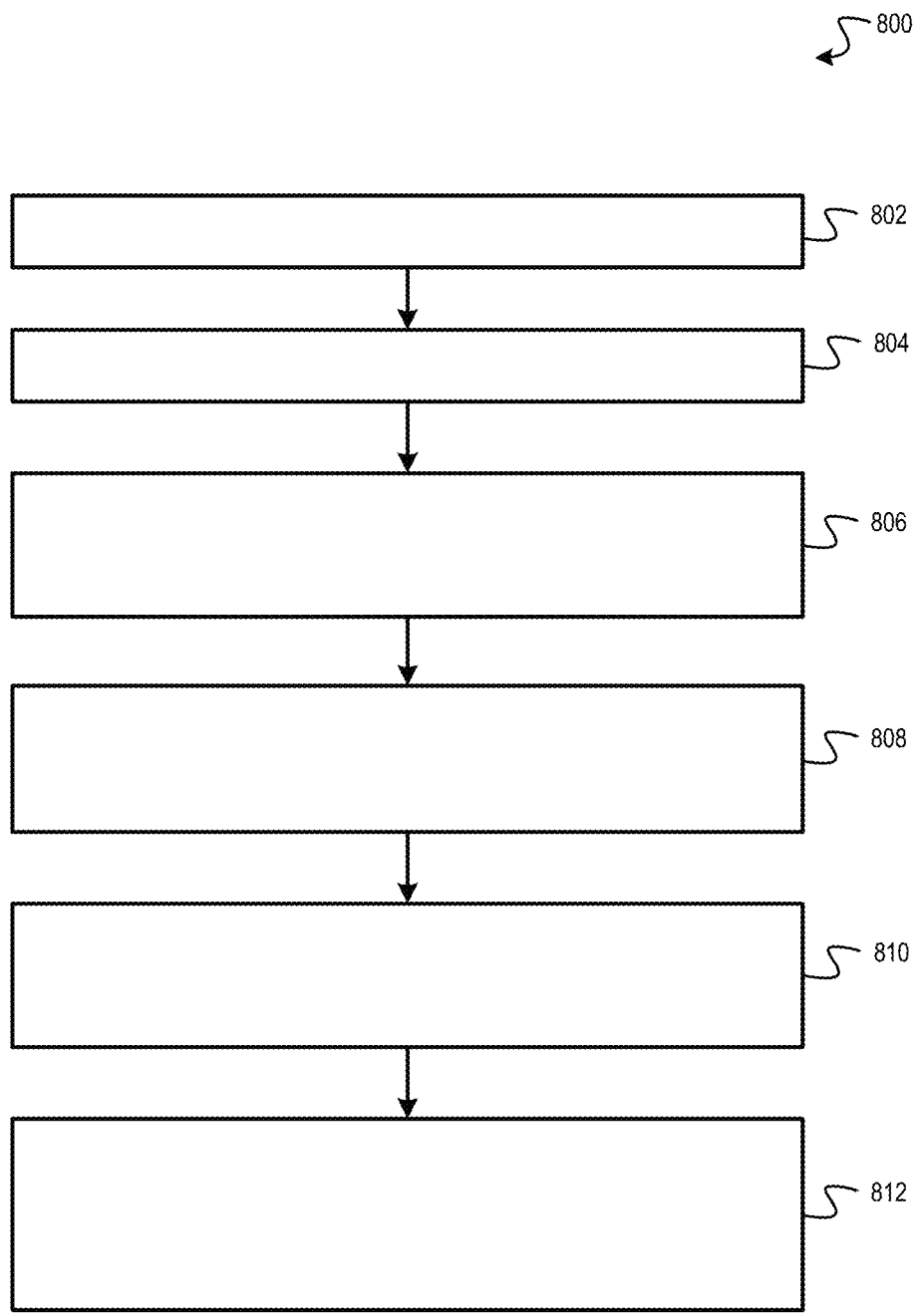
FIG. 8 is a flowchart representation of a method of monitoring SOH of a battery system as a function of vehicle age in accordance with at least one embodiment.

Referring to FIG. 8, a flowchart representation of a method 800 of monitoring SOH of a battery system as a function of vehicle age in accordance with at least one embodiment is shown. The method 800 will be described with reference to an exemplary implementation of the battery system SOH monitoring system 144. As can be appreciated in light of the disclosure, the order of operation within the method 800 is not limited to the sequential execution as illustrated in FIG. 8. but may be performed in one or more varying orders as applicable and in accordance with the present disclosure.

At 802, a current SOH value of the battery system 112 is calculated by the battery system SOH monitoring system 144. In at least one embodiment, the current SOH value of the battery system 112 is based on a current battery capacity of the battery system 112 and a beginning of life battery (BOL) capacity of the battery system 112. The current SOH value of the battery system 112 is calculated by dividing the current battery capacity by the BOL battery capacity. In at least one embodiment, the current SOH value of the battery system 112 is based on a current battery useable battery energy (UBE) of the battery system 112 and a BOL battery UBE. The current SOH value of the battery system 112 is calculated by dividing the current battery UBE by the BOL battery UBE. In various embodiments, the current SOH value of the battery system 112 is represented as a percentage of the BOL capacity. In various embodiments, the current SOH value of the battery system 112 is represented as a percentage of as the BOL battery UBE.

At 804, historical SOH values of the battery system 112 are retrieved by the battery system SOH monitoring system 144. The SOH value of the battery system 112 is calculated periodically at different vehicle ages of the EV 110. The periodicity may, for example, be every day, every few days, every few months, or every year. Each of these times represent a different vehicle age of the EV 110. The SOH values of the battery system 112 are maintained by the battery system SOH monitoring system 144. In at least one embodiment, the battery system SOH monitoring system 144 retrieves all of the historical SOH values starting from the BOL of the battery system 112 when the vehicle age is zero. In at least one embodiment, the battery system SOH monitoring system 144 retrieves the historical SOH values that fall within a pre-defined vehicle age window. The SOH value of the battery system 112 may drop at a greater rate during the initial usage of the battery system 112. The pre-defined vehicle age window excludes that initial usage period. The battery system SOH monitoring system 144 uses the historical SOH values that begin following the initial usage period and extends to the current time (current vehicle age). In various embodiments, the pre-defined vehicle age window may be a moving window through the vehicle age time domain. The pre-defined vehicle age window is a fixed time period that moves through the vehicle age time domain.

At 806, a projected SOH value of the battery system 112 based on continued usage of the battery system 112 to power offboard vehicle load(s) 136 and/or onboard accessory load(s) 132 is generated at a future vehicle age. For example, the battery system 112 may have a manufacturer specified vehicle age warranty of 8 years. The projected SOH value of the battery system 112 is based on continued usage of the battery system 112 to power offboard vehicle load(s) 136 and/or onboard accessory load(s) 132 is generated at the vehicle age warranty of 8 years. The vehicle age warranty is used at the future vehicle age. The projected SOH value based on continued usage of the battery system 112 to power offboard vehicle load(s) 136 and/or onboard accessory load(s) 132 is based on the current SOH value of the battery system 112 and the historical SOH values of the battery system 112.

At 808, a projected SOH value of the battery system 112 based on a discontinuation of usage of the battery system 112 to power offboard vehicle load(s) 136 and/or onboard accessory load(s) 132 is generated at the future vehicle age. The projected SOH value of the battery system 112 based on a discontinuation of usage of the battery system 112 to power offboard vehicle load(s) 136 and/or onboard accessory load(s) 132 reflects usage of the battery system 112 to power just the propulsion load(s) of the EV 110.

At 810, the projected SOH value of the battery system 112 based on continued usage of the battery system 112 to power offboard vehicle load(s) 136 and/or onboard accessory load(s) 132 is compared to a number of different SOH thresholds. In various embodiments, the projected SOH value of the battery system 112 based on continued usage of the battery system 112 to power offboard vehicle load(s) 136 and/or onboard accessory load(s) 132 and the projected SOH value of the battery system 112 based on the discontinuation of usage of the battery system 112 to power offboard vehicle load(s) 136 and/or onboard accessory load(s) 132 is compared to a number of different SOH thresholds.

At 812, one of a number of different customer SOH alerts associated with limitations in connection with the use of the battery system 112 to supply power to offboard vehicle load(s) 136 and/or onboard accessory load(s) 132 is generated for display on an interface 148 of the EV 110 based on the comparison. The different SOH thresholds and associated customer SOH alerts will be described in greater detail below.

Figure 9:
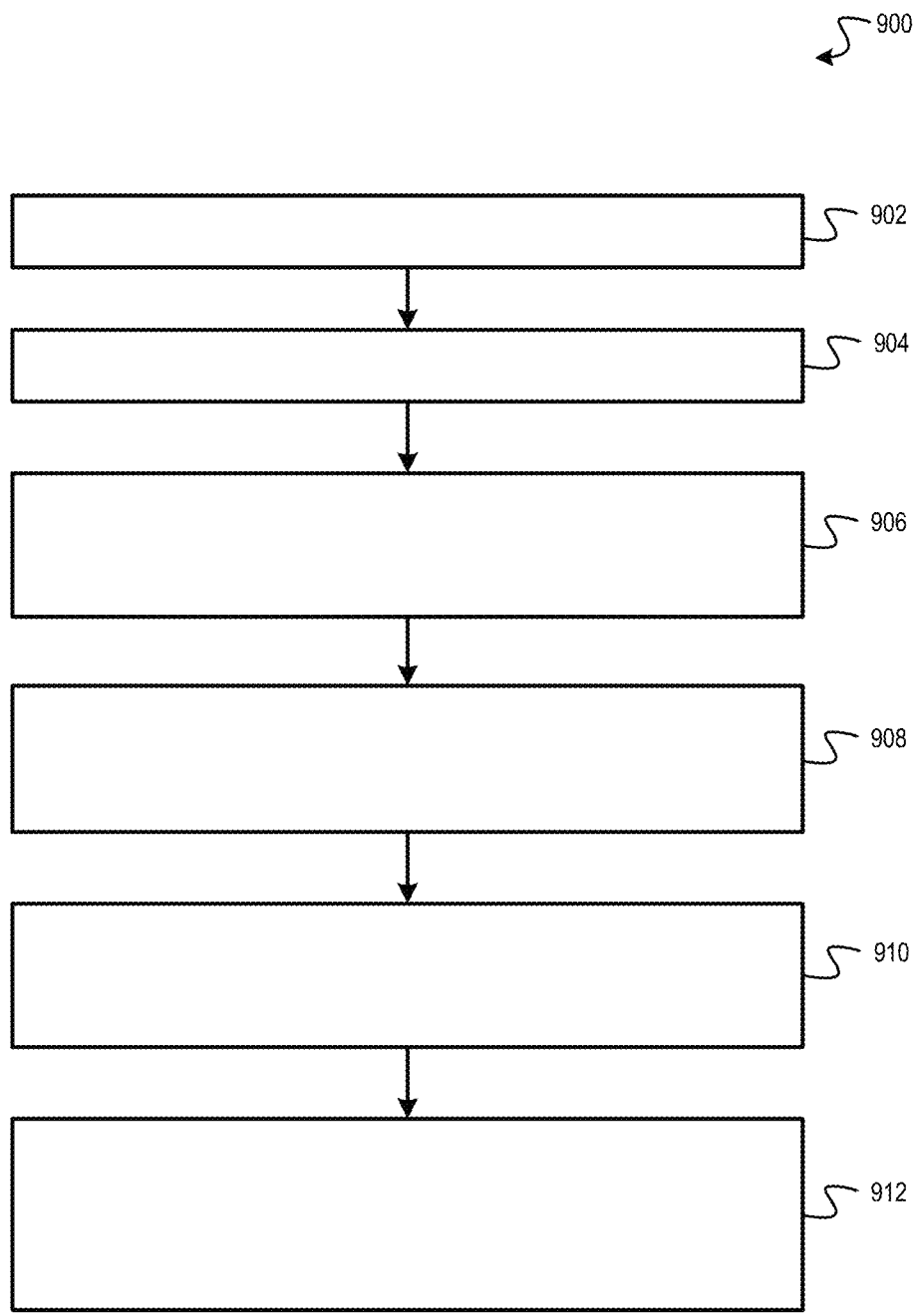
FIG. 9 is a flowchart representation of a method of monitoring SOH of a battery system as a function of total EV mileage in accordance with at least one embodiment.

Referring to FIG. 9, a flowchart representation of a method 900 of monitoring SOH of a battery system as a function of total EV mileage in accordance with at least one embodiment is shown. The method 900 will be described with reference to an exemplary implementation of the battery system SOH monitoring system 144. As can be appreciated in light of the disclosure, the order of operation within the method 900 is not limited to the sequential execution as illustrated in FIG. 9 but may be performed in one or more varying orders as applicable and in accordance with the present disclosure.

At 902, a current SOH value of the battery system 112 is calculated by the battery system SOH monitoring system 144. In at least one embodiment, the current SOH value of the battery system 112 is based on a current battery capacity of the battery system 112 and a beginning of life battery (BOL) capacity of the battery system 112. The current SOH value of the battery system 112 is calculated by dividing the current battery capacity by the BOL battery capacity. In at least one embodiment, the current SOH value of the battery system 112 is based on a current battery useable battery energy (UBE) of the battery system 112 and a BOL battery UBE. The current SOH value of the battery system 112 is calculated by dividing the current battery UBE by the BOL battery UBE. In various embodiments, the current SOH value of the battery system 112 is represented as a percentage of the BOL capacity. In various embodiments, the current SOH value of the battery system 112 is represented as a percentage of as the BOL battery UBE.

At 904, historical SOH values of the battery system 112 are retrieved by the battery system SOH monitoring system 144. The SOH value of the battery system 112 is calculated periodically at different total EV mileages of the EV 110. The periodicity may, for example, be every pre-defined number of total EV miles. For example, the total EV mileage may be calculated every 1000 total EV miles. The SOH values of the battery system 112 are maintained by the battery system SOH monitoring system 144. In at least one embodiment, the battery system SOH monitoring system 144 retrieves all of the historical SOH values starting from the BOL of the battery system 112 when the total EV mileage of the EV 110 is zero. In at least one embodiment, the battery system SOH monitoring system 144 retrieves the historical SOH values that fall within a pre-defined total EV mileage window. The SOH of health value of the battery system 112 may drop at a greater rate during the initial total EV mileage of the battery system 112. The pre-defined total EV mileage window excludes that initial total EV mileage. The battery system SOH monitoring system 144 uses the historical SOH values that begin following the initial total EV mileage and extends to the current total EV mileage. In various embodiments, the pre-defined total EV mileage window may be a moving window through the total EV mileage distance domain. The pre-defined total EV mileage window moves through the total EV mileage distance domain.

In various embodiments, each total EV mileage is a sum of a driven EV mileage and a virtual EV mileage. The virtual EV mileage is based on the use of the battery system 112 to supply power to offboard vehicle load(s) 136 and/or onboard accessory load(s) 132. The mechanisms used to generate the calculations of the virtual EV mileages and the total EV mileages are described above. In various embodiments, each total EV mileage is a driven EV mileage.

At 906, a projected SOH value of the battery system 112 based on continued usage of the battery system 112 to power offboard vehicle load(s) 136 and/or onboard accessory load(s) 132 is generated at a future total EV mileage. In various embodiments, the battery system 112 has a manufacturer defined vehicle warranty mileage. The vehicle warranty mileage is used as the future total EV mileage. For example, the manufacturer defined vehicle warranty mileage may be 100,000 miles. The projected SOH value of the battery system 112 based on continued usage of the battery system 112 to power offboard vehicle load(s) 136 and/or onboard accessory load(s) 132 is generated at the vehicle warranty mileage of 100,000 miles. The projected SOH value is based on continued usage of the battery system 112 to power offboard vehicle load(s) 136 and/or onboard accessory load(s) 132 is based on the current SOH value of the battery system 112 and the historical SOH values of the battery system 112.

At 908, a projected SOH value of the battery system 112 based on a discontinuation of usage of the battery system 112 to power offboard vehicle loads 136 and/or onboard accessory load(s) 132 is generated at the future total EV mileage. The projected SOH value of the battery system 112 based on a discontinuation of usage of the battery system 112 to power offboard vehicle load(s) 136 and/or onboard accessory load(s) 132 reflects usage of the battery system 112 to power just the propulsion load(s) of the EV 110.

At 910, the projected SOH value of the battery system 112 based on continued usage of the battery system 112 to power offboard vehicle load(s) 136 and/or onboard accessory load(s) 132 is compared to a number of different SOH thresholds. In various embodiments, the projected SOH value of the battery system 112 based on continued usage of the battery system 112 to power offboard vehicle load(s) 136 and/or onboard accessory load(s) 132 and the projected SOH value of the battery system 112 based on the discontinuation of usage of the battery system 112 to power offboard vehicle load(s) 136 and/or onboard accessory load(s) 132 is compared to a number of different SOH thresholds.

At 912, one of a number of different customer SOH alerts associated with limitations in connection with the use of the battery system 112 to supply power to offboard vehicle load(s) 136 and/or onboard accessory load(s) 132 is generated for display on an interface 148 of the EV 110 based on the comparison. The different SOH thresholds and associated customer SOH alerts will be described in greater detail below.

Figure 10A:
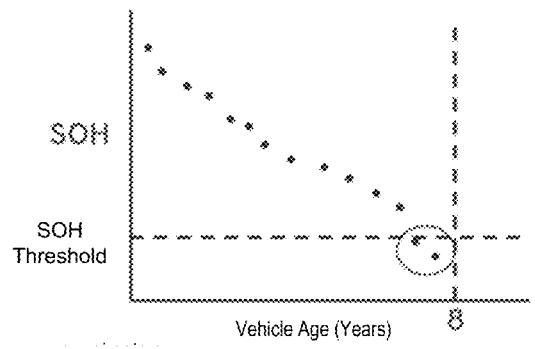
FIG. 10A-10C are exemplary graphical illustrations of relationships between a SOH of a battery system of an EV as a function of vehicle age of the EV with respect to an SOH threshold in accordance with at least one embodiment.
Figure 10B:
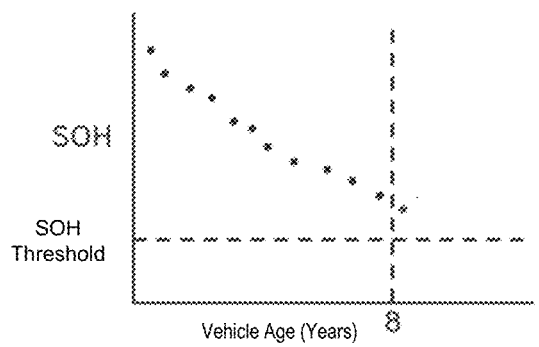
Figure 10C:
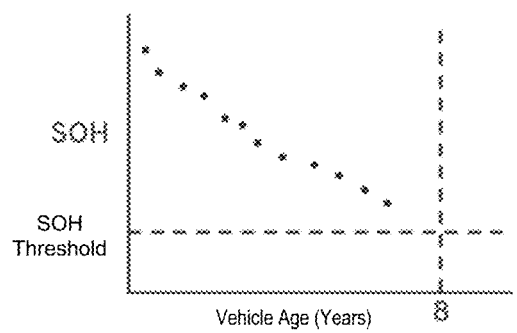

Referring to FIG. 10A-10C exemplary graphical illustrations of relationships between a SOH values of a battery system 112 of an EV 110 as a function of vehicle age of the EV 110 with respect to an SOH threshold in accordance with at least one embodiment are shown. The future vehicle age of 8 years is the vehicle age warranty for the EV 110. If the SOH value of the battery system 112 falls below the SOH threshold prior to the expiration of vehicle age warranty of 8 years, the warranty is considered to be void.

FIG. 10A is an example where the projected SOH values of the battery system 112 of the EV 110 fall below the SOH threshold prior to the expiration of the vehicle age warranty of 8 years. The projected SOH values are based on the combined use of the battery system 112 to power the propulsion system of the EV 110 and continued use of the battery system 112 to supply power to offboard vehicle load(s) 136 and/or onboard accessory load(s) 132. A customer SOH alert is generated for display on a display device 148 of the EV 110. The customer SOH alert provides a notification to the customer to limit or discontinue use of the battery system 112 to supply power to offboard vehicle load(s) 136 and/or onboard accessory load(s) 132 so that the vehicle age warranty associated with the battery system 112 will not be voided.

FIG. 10C is an example of a current SOH value and historical SOH values that may be used to generate the projected SOH values of the battery system 112 for the example illustrated in FIG. 10A.

FIG. 10B is an example where the projected SOH values of the battery system 112 of the EV 110 remain above the SOH threshold at the vehicle age warranty of 8 years. The projected SOH values are based on the combined use of the battery system 112 to power the propulsion system of the EV 110 and continued use of the battery system 112 to supply power to offboard vehicle load(s) 136 and/or onboard accessory load(s) 132. There is no customer SOH alert generated since based on the comparison of the projected SOH values to the SOH threshold, continued use of the battery system 112 to supply power to offboard vehicle load(s) 136 and/or onboard accessory load(s) 132 will not void the vehicle age warranty associated with the battery system 112.

Figure 11A:
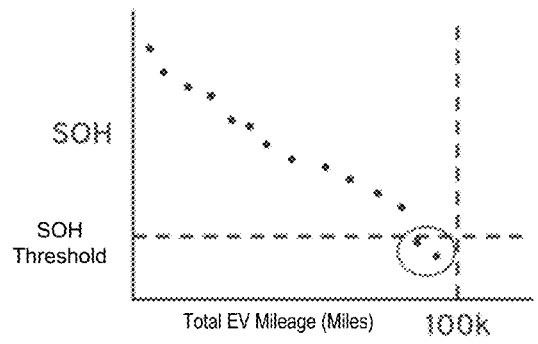
FIG. 11A-11C are exemplary graphical illustrations of relationships between a SOH of a battery system of an EV as a function of total EV miles of the EV with respect to an SOH threshold in accordance with at least one embodiment.
Figure 11B:
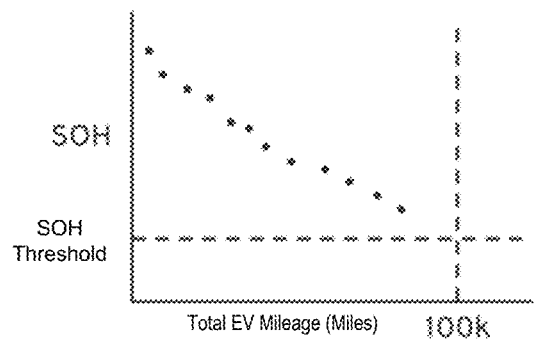
Figure 11C:
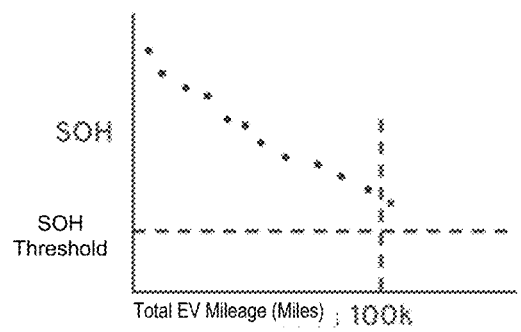

Referring to FIG. 11A-11C, exemplary graphical illustrations of relationships between SOH values of a battery system 112 of an EV 110 as a function of total EV mileage the EV 110 with respect to an SOH threshold in accordance with at least one embodiment are shown. The future total EV mileage of 100,000 miles is the vehicle warranty mileage for the EV 110. If the SOH of the battery system 112 falls below the SOH threshold prior to the expiration of vehicle warranty mileage of 100,000 miles, the warranty is considered to be void. In at least one embodiment, the total EV mileage is a sum of driven miles and virtual miles. In at least one embodiment, the total EV mileage is driven miles.

FIG. 11A is an example where the projected SOH values of the battery system 112 of the EV 110 fall below the SOH threshold prior to the expiration of the vehicle warranty mileage of 100,000 miles. The projected SOH values are based on the combined use of the battery system 112 to power the propulsion system of the EV 110 and continued use of the battery system 112 to supply power to offboard vehicle load(s) 136 and/or onboard accessory load(s) 132. A customer SOH alert is generated for display on a display device 148 of the EV 110. The customer SOH alert provides a notification to the customer to limit or discontinue use of the battery system 112 to supply power to offboard vehicle load(s) 136 and/or onboard accessory load(s) 132 so that the vehicle warranty mileage associated with the battery system 112 will not be voided.

FIG. 11B is an example of a current SOH value and historical SOH values that may be used to generate the projected SOH values of the battery system 112 for the example illustrated in FIG. 11A.

FIG. 11C is an example where the projected SOH values of the battery system 112 of the EV 110 remain above the SOH threshold at the vehicle warranty mileage of 100,000 miles. The projected SOH values are based on the combined use of the battery system 112 to power the propulsion system of the EV 110 and continued use of the battery system 112 to supply power to offboard vehicle load(s) 136 and/or onboard accessory load(s) 132. There is no customer SOH alert generated since based on the comparison of the projected SOH values to the SOH threshold, continued use of the battery system 112 to supply power to offboard vehicle load(s) 136 and/or onboard accessory load(s) 132 will not void the vehicle warranty mileage associated with the battery system 112.

Figure 12:
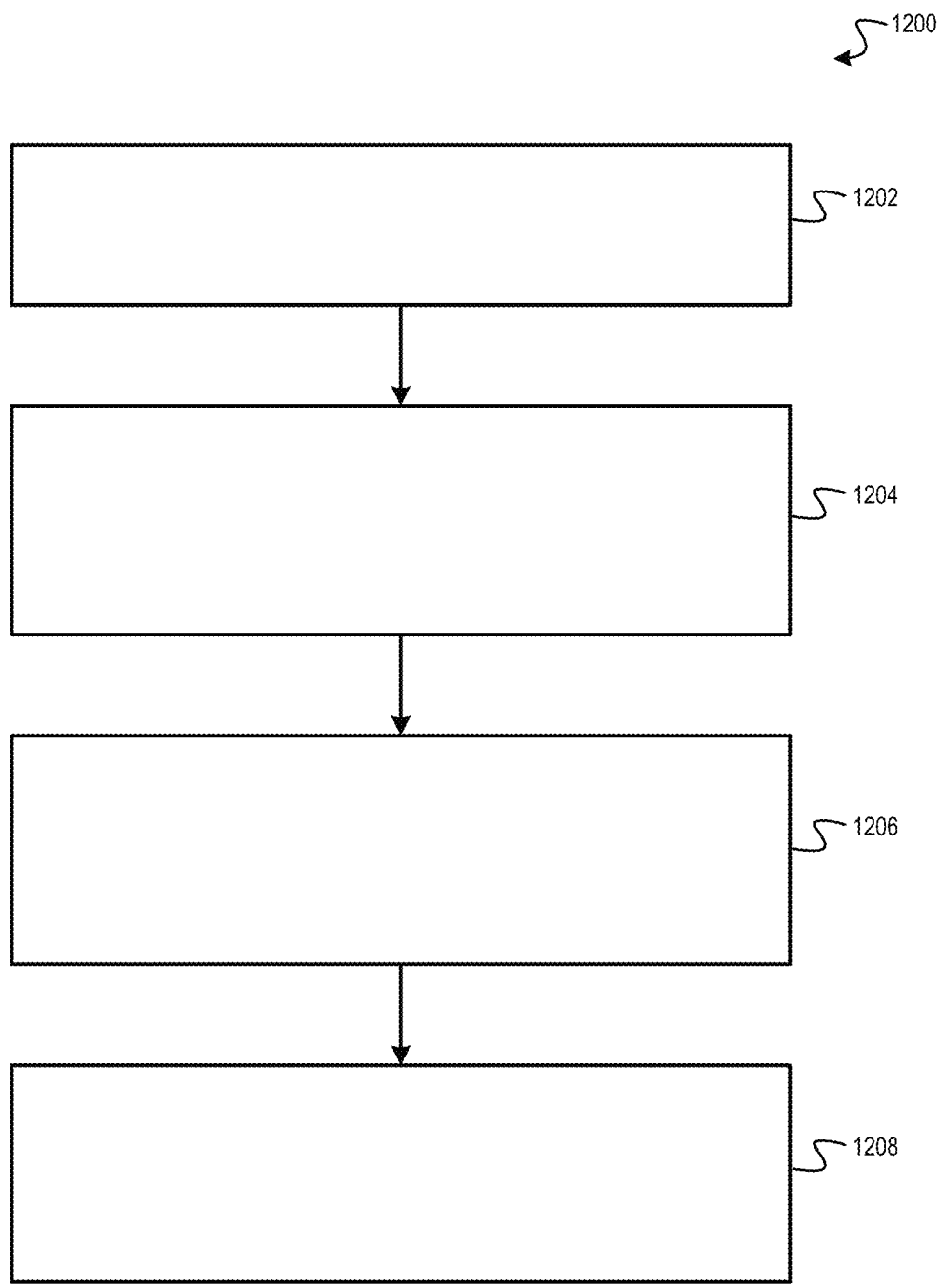
FIG. 12 is a flowchart representation of a method of generating SOH customer alerts associated with different SOH thresholds in accordance with at least one embodiment.

Referring to FIG. 12, a flowchart representation of a method 1200 of generating SOH customer alerts associated with different SOH thresholds in accordance with at least one embodiment is shown. The method 1200 will be described with reference to an exemplary implementation of the battery system SOH monitoring system 144. As can be appreciated in light of the disclosure, the order of operation within the method 1200 is not limited to the sequential execution as illustrated in FIG. 12 but may be performed in one or more varying orders as applicable and in accordance with the present disclosure.

At 1202, based on a determination that the projected SOH value of the battery system is less than the first SOH threshold, the battery system SOH monitoring system 144: disables an ability of the battery system to supply power to all of the offboard vehicle loads 136 and the onboard accessory loads 132 and generates a customer SOH alert including a first notification for display on the interface 148 of the EV 110. The first notification indicates that the ability of battery system to supply power to all of the offboard vehicle loads 136 and the onboard accessory loads 132 has been disabled. When the projected SOH of the battery system 112 falls below the first threshold, the current SOH of the battery system 112 is critically low.

At 1204, based on a determination that the projected SOH value of the battery system falls within a first SOH threshold range, the battery system SOH monitoring system 144: limits an amount of power that can be supplied by the battery system 112 to a first subset of the offboard vehicle loads 136 and the onboard accessory loads 132, disables an ability of the battery system 112 to supply power to a second subset of the offboard vehicle loads and the onboard accessory loads, and generates a customer SOH alert including a second notification for display on the interface 148 of the EV 110. The second notification indicates that the amount of power that can be supplied by the battery system 112 to the first subset the offboard vehicle loads 136 and the onboard accessory loads 132 has been limited and that the ability of the battery system 112 to supply power to a second subset of the offboard vehicle loads 136 and the onboard accessory loads 132 has been disabled. The first SOH threshold range is between the first SOH threshold value and a second SOH threshold value. The second SOH threshold value is greater than the first SOH threshold value. When the projected SOH of the battery system 112 falls within the first SOH threshold range, the current SOH of the battery system 112 is very low.

At 1206, based on a determination that the projected SOH value of the battery system falls within a second SOH threshold range, the battery system SOH monitoring system 144 recommends limiting use of the battery system 112 to supply power to the offboard vehicle loads 136 and the onboard accessory loads 132, limits an amount of power that can be supplied by the battery system 112 to a third subset of the offboard vehicle loads 136 and the onboard accessory loads 132, and generates a customer SOH alert including a third notification for display on the interface 148 of the EV 110. The third notification indicates includes a recommendation to limit use of the battery system 112 the offboard vehicle loads 136 and the onboard accessory loads 132 and indicates that the amount of power that can be supplied to the third subset of the offboard vehicle loads 136 and the onboard accessory loads 132 has been limited. The second SOH threshold range is between the second SOH threshold value and a third SOH threshold value. The third SOH threshold value is greater than the second SOH threshold value. When the projected SOH of the battery system 112 falls within the second SOH threshold range, the current SOH of the battery system 112 is low.

At 1208, based on a determination that the projected SOH value of the battery system falls within a third SOH threshold range, the battery system SOH monitoring system 144 generates a customer SOH alert including a fourth notification. The fourth notification includes a recommendation to limit use of the battery system 112 to supply power to the offboard vehicle loads 136 and the onboard accessory loads 132. The third SOH threshold range is between the third SOH threshold value and a fourth SOH threshold value. The fourth SOH threshold value is greater than the third SOH threshold value. When the projected SOH of the battery system 112 falls within the third SOH threshold range, the current SOH of the battery system 112 is slightly low.

In at least one embodiment, the battery system SOH monitoring system 144 is configured to generate a first projected SOH value of the battery system 112 of the EV 110 at a future vehicle age. The future vehicle age is a vehicle age warranty. The projected SOH value of the battery system 112 is based on the current SOH value of the battery system 112 and the historical SOH values of the battery system 112. The current SOH value of the battery system 112 and the historical SOH values of the battery system 112 are based at least in part on use of the battery system 112 to supply power to offboard vehicle loads 136 and/or an onboard accessory loads 132. The battery system SOH monitoring system 144 is configured to generate a second projected SOH value of the battery system 112 of the EV 110 at the future vehicle age. The second projected SOH value of the battery system 112 is based on discontinuation of the use of the battery system 112 to supply power to the offboard vehicle loads 136 and/or the onboard accessory loads 132. The battery system SOH monitoring system 144 is configured to determine whether the first projected SOH value is less than a SOH threshold and the second projected SOH value is greater than the SOH threshold. The battery system SOH monitoring system 144 generates a customer SOH alert if the first projected SOH value is less than a SOH threshold and the second projected SOH value is greater than the SOH threshold. The customer alert is associated with limitations in connection with the use of the battery system 112 to supply power to the offboard vehicle loads 136 and/or the onboard accessory loads 132 for display on an interface 148 of the EV 110. An example of an interface 148 is a display device.

In at least one embodiment, the battery system SOH monitoring system 144 is configured to generate a first projected SOH value of the battery system 112 of the EV 110 at a future total EV mileage. The future total EV mileage is a vehicle warranty mileage. The projected SOH value of the battery system 112 is based on the current SOH value of the battery system 112 and the historical SOH values of the battery system 112. The current SOH value of the battery system 112 and the historical SOH values of the battery system 112 are based at least in part on use of the battery system 112 to supply power to offboard vehicle loads 136 and/or an onboard accessory loads 132. The battery system SOH monitoring system 144 is configured to generate a second projected SOH value of the battery system 112 of the EV 110 at the future total EV mileage. The second projected SOH value of the battery system 112 is based on discontinuation of the use of the battery system 112 to supply power to the offboard vehicle loads 136 and/or the onboard accessory loads 132. The battery system SOH monitoring system 144 is configured to determine whether the first projected SOH value is less than a SOH threshold and the second projected SOH value is greater than the SOH threshold. The battery system SOH monitoring system 144 generates a customer SOH alert if the first projected SOH value is less than a SOH threshold and the second projected SOH value is greater than the SOH threshold. The customer alert is associated with limitations in connection with the use of the battery system 112 to supply power to the offboard vehicle loads 136 and/or the onboard accessory loads 132 for display on an interface 148 of the EV 110. An example of an interface 148 is a display device.

In at least one embodiment, the battery system SOH monitoring system 144 is configured to generate a first projected SOH value of the battery system 112 at a future vehicle age. The future vehicle age is a vehicle age warranty. The first projected SOH value of the battery system 112 is based on the current SOH value of the battery system 112 and historical SOH values of the battery system 112 during corresponding historical vehicle ages. The battery system SOH monitoring system 144 is configured to generate a second projected SOH value of the battery system 112 at the future total EV mileage. The future total EV mileage is a vehicle warranty mileage. The second projected SOH value of the battery system 112 is based on the current SOH value of the battery system 112 at a current total EV mileage and historical SOH values of the battery system 112 during corresponding historical total EV mileages. In at least one embodiment, each total EV mileage is a sum of a driven EV mileage and a virtual EV mileage. Each virtual EV mileage is based on the use of the battery system 112 to supply power to the offboard vehicle loads 136 and the onboard accessory loads 132. In at least one embodiment, the total EV mileage is the driven EV mileage. The battery system SOH monitoring system 144 is configured to determine whether both the first projected SOH value and the second projected SOH value are less than a SOH threshold. The battery system SOH monitoring system 144 generates a customer SOH alert if both the first projected SOH value and the second projected SOH value are less than a SOH threshold. The customer alert is associated with limitations in connection with the use of the battery system 112 to supply power to the offboard vehicle loads 136 and/or the onboard accessory loads 132 for display on an interface 148 of the EV 110. An example of an interface 148 is a display device.

Figure 13:
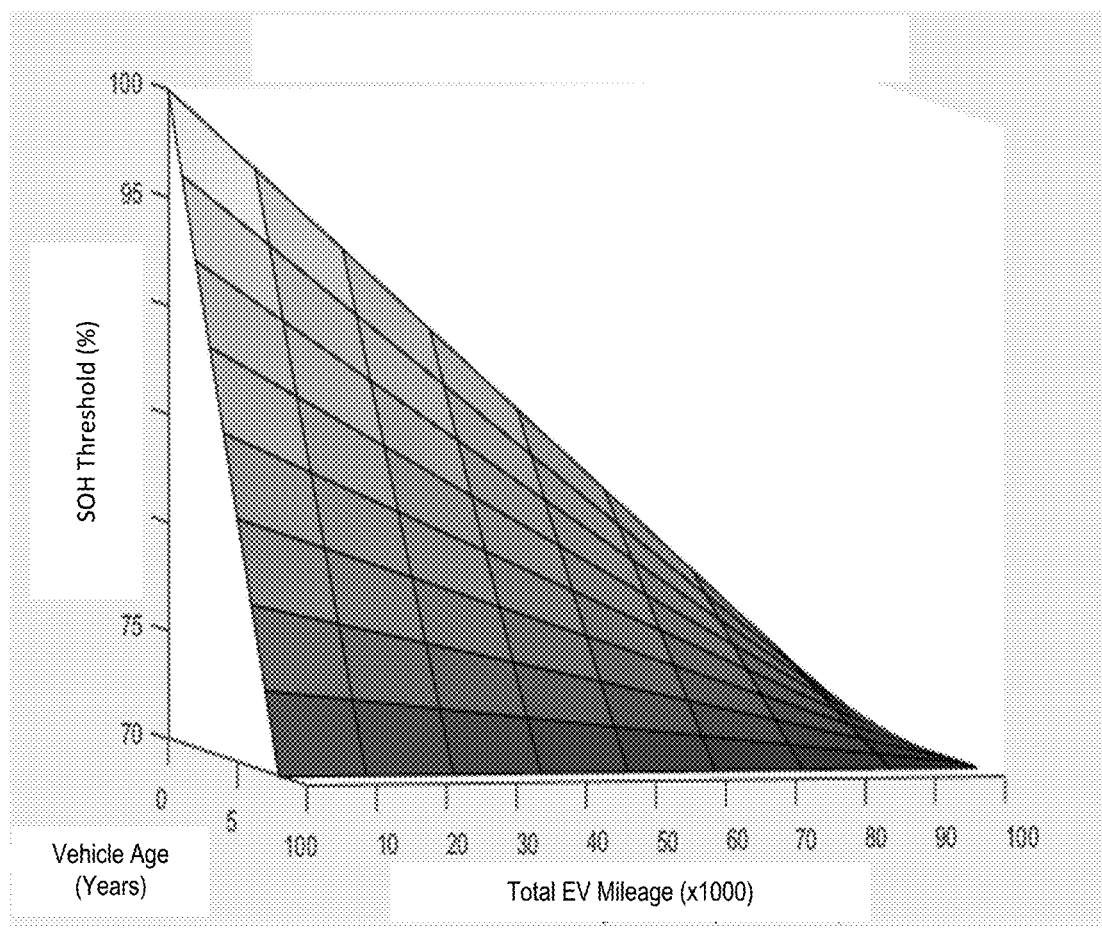
FIG. 13 is an exemplary graphical illustration of predefined relationships between SOH values of the battery system, vehicle ages, total EV mileages, and SOH thresholds in accordance with at least one embodiment.

Referring to FIG. 13, an exemplary graphical illustration of pre-defined relationships between SOH values of the battery system 112, vehicle ages, total EV mileages, and battery SOH thresholds in accordance with at least one embodiment. Numerous hypothetical customer use cases are modeled and resulting battery system 112 degradation across all those conditions are used to determine the SOH thresholds that are unlikely to meet warranty conditions for most customers without the implementation of limitations on the use of offboard vehicle loads 136 and/or onboard accessory loads 132. The pre-defined relationships are based on interpolating the following values (i) SOH value of zero at a vehicle warranty mileage and zero calendar age at a 100%

SOH value, (ii) all values at the vehicle age warranty (e.g. 8 years)–[warranty threshold] % SOH, (iii) all values at vehicle warranty mileage (e.g. 100,000 miles)–[warranty threshold] % SOH. On a current SOH value of the battery system 112 and an SOH threshold of the battery system 112 is defined by the graph (SOH threshold is a surface and is a function of current total EV mileage and current vehicle age). SOH deficit=the SOH threshold of the battery system 112–current SOH value of the battery system 112.

In at least one embodiment, the battery system SOH monitoring system 144 is configured to determine the current battery SOH value of the battery system and determine a current vehicle age. The battery system SOH monitoring system 144 is configured to determine a current total EV mileage. In at least one embodiment, the current total EV mileage is a sum of a current driven EV mileage and a current virtual EV mileage. The current virtual EV mileage is based on the use of the battery system 112 to supply power to offboard vehicle loads 136 and/or the onboard accessory loads 132. In at least one embodiment, the current total EV mileage is a current driven EV mileage. The battery system SOH monitoring system 144 is configured to identify the SOH threshold associated with the current battery SOH value, the current vehicle age, and the current total EV mileage using the pre-defined relationships between battery SOH values, vehicle ages, total EV mileages, and battery SOH thresholds illustrated in the exemplary graph.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A battery system state of health (SOH) monitoring system for an electric vehicle (EV) comprising:
    at least one processor; and
    at least one memory communicatively coupled to the at least one processor, the at least one memory comprising instructions that upon execution by the at least one processor, cause the at least one processor to:
        generate a projected SOH value of a battery system of the EV at one of a future vehicle age and a future total EV mileage, wherein:
            the projected SOH value of the battery system is based on a current SOH value of the battery system and historical SOH values of the battery system; and
            the current SOH value of the battery system and the historical SOH values of the battery system are based on use of the battery system to supply power to at least one of an offboard vehicle load and an onboard accessory load; and
        based on a determination that the projected SOH value of the battery system is less than a first SOH threshold at the one of the future vehicle age and the future total EV mileage:
            generate a customer SOH alert associated with limitations in connection with the use of the battery system to supply power to the at least one of the offboard vehicle load and the onboard accessory load for display on a display device of the EV;
            disable an ability of the battery system to supply power to all of the at least one of the offboard vehicle load and the onboard accessory load; and
            wherein the customer SOH alert comprises a first notification that the ability of battery system to supply power to all of the at least one of the offboard vehicle load and the onboard accessory load has been disabled.

2. The system of claim 1, wherein based on a determination that the projected SOH value of the battery system falls within a first SOH threshold range between the first SOH threshold value and a second SOH threshold value, wherein the second SOH threshold value is greater than the first SOH threshold value, the at least one memory comprises further instructions that upon execution by the at least one processor, cause the at least one processor to:
    limit an amount of power that can be supplied by the battery system to a first subset of the at least one of the offboard vehicle load and the onboard accessory load;
    disable an ability of the battery system to supply power to a second subset of the at least one of the offboard vehicle load and the onboard accessory load; and
    generate the customer SOH alert, the customer SOH alert comprising a second notification that the amount of power that can be supplied by the battery system to the first subset of the at least one of the offboard vehicle load and the onboard accessory load has been limited and that the ability of the battery system to supply power to the second subset of the at least one of the offboard vehicle load and the onboard accessory load has been disabled.

3. The system of claim 2, wherein based on a determination that the projected SOH value of the battery system falls within a second SOH threshold range between the second SOH threshold value and a third SOH threshold value, wherein the third SOH threshold value is greater than the second SOH threshold value, the at least one memory comprises further instructions that upon execution by the at least one processor, cause the at least one processor to
    recommend limiting use of the battery system to supply power to the at least one of the offboard vehicle load and the onboard accessory load;
    limit an amount of power that can be supplied by the battery system to a third subset of the at least one of the offboard vehicle load and the onboard accessory load; and
    generate the customer SOH alert, the customer SOH alert comprising a third notification to recommend limiting use of the battery system to supply power to the at least one of the offboard vehicle load and the onboard accessory load and that the amount of power that can be supplied to the third subset of the at least one of the offboard vehicle load and the onboard accessory load has been limited.

4. The system of claim 3, wherein based on a determination that the projected SOH value of the battery system falls within a third SOH threshold range between the third SOH threshold value and a fourth SOH threshold value, wherein the fourth SOH threshold value is greater than the third SOH threshold value, the at least one memory comprises further instructions that upon execution by the at least one processor, cause the at least one processor to generate the customer SOH alert, the customer SOH alert comprising a fourth notification to recommend limiting use of the battery system to supply power to the at least one of the offboard vehicle load and the onboard accessory load.

5. The system of claim 1, wherein the at least one memory comprises further instructions that upon execution by the at least one processor, cause the at least one processor to:
   generate the projected SOH value of the battery system at the future vehicle age, wherein the projected SOH value of the battery system is based on the current SOH value of the battery system and historical SOH values of the battery system during corresponding historical vehicle ages; and
   determine whether the projected SOH value of the battery system is less than the first SOH threshold at the future vehicle age.

6. The system of claim 5, wherein the at least one memory comprises further instructions that upon execution by the at least one processor, cause the at least one processor to generate the projected SOH value of the battery system at the future vehicle age, wherein the projected SOH value of the battery system is based on the current SOH value of the battery system and the historical SOH values of the battery system during the corresponding historical vehicle ages within a pre-defined vehicle age window.

7. The system of claim 1, wherein the future vehicle age is a vehicle age warranty.

8. The system of claim 1, wherein the at least one memory comprises further instructions that upon execution by the at least one processor, cause the at least one processor to:
   generate the projected SOH value of the battery system at the future total EV mileage, wherein:
      the projected SOH value of the battery system is based on the current SOH value of the battery system at a current total EV mileage and historical SOH values of the battery system during corresponding historical total EV mileages;
      each total EV mileage is a sum of a driven EV mileage and a virtual EV mileage; and
      each virtual EV mileage is based on the use of the battery system to supply power to the at least one of the offboard vehicle load and the onboard accessory load; and
   determine whether the projected SOH value of the battery system is less than the first SOH threshold at the future total EV mileage.

9. The system of claim 8, wherein the at least one memory comprises further instructions that upon execution by the at least one processor, cause the at least one processor to generate the projected SOH value of the battery system at the future total EV mileage, wherein the projected SOH value of the battery system is based on the current SOH value of the battery system and the historical SOH values of the battery system during the corresponding historical total EV mileages within a pre-defined total EV mileage window.

10. The system of claim 1, wherein the future total EV mileage is a vehicle warranty mileage.

11. The system of claim 1, wherein the at least one memory comprises further instructions that upon execution by the at least one processor, cause the at least one processor to:
   determine the current battery SOH value of the battery system;
   determine a current vehicle age;
   determine a current total EV mileage, wherein the current total EV mileage is a sum of a current driven EV mileage and a current virtual EV mileage, and the current virtual EV mileage is based on the use of the battery system to supply power to the at least one of the offboard vehicle load and the onboard accessory load; and
   identify the first SOH threshold associated with the current battery SOH value, the current vehicle age, and the current total EV mileage using pre-defined relationships between battery SOH values, vehicle ages, total EV mileages, and SOH thresholds.

12. The system of claim 1, wherein the at least one memory comprises further instructions that upon execution by the at least one processor, cause the at least one processor to:
   generate a first projected SOH value of the battery system at the future vehicle age, wherein the first projected SOH value of the battery system is based on the current SOH value of the battery system and historical SOH values of the battery system during corresponding historical vehicle ages;
   generate a second projected SOH value of the battery system at the future total EV mileage wherein:
      the second projected SOH value of the battery system is based on the current SOH value of the battery system at a current total EV mileage and historical SOH values of the battery system during corresponding historical total EV mileages;
      each total EV mileage is a sum of a driven EV mileage and a virtual EV mileage; and
      each virtual EV mileage is based on the use of the battery system to supply power to the at least one of the offboard vehicle load and the onboard accessory load; and
   determine whether both the first projected SOH value and the second projected SOH value are less than the first SOH threshold; and
   generate the customer SOH alert based on a determination that both the first projected SOH value and the second projected SOH value are less than the first SOH threshold.

13. The system of claim 1, wherein the at least one memory comprises further instructions that upon execution by the at least one processor, cause the at least one processor to:
   generate the projected SOH value of the battery system of the EV the at one of the future vehicle age and the future total EV mileage, wherein:
      the projected SOH value of the battery system is based on the current SOH value of the battery system and the historical SOH values of the battery system; and
      the current SOH value of the battery system and the historical SOH values of the battery system are based on use of the battery system to supply power to at least one of the offboard vehicle load and the onboard accessory load;
   generate another projected SOH value of the battery system of the EV the at one of the future vehicle age and the future total EV mileage, wherein the another projected SOH value of the battery system is based on discontinuation of the use of the battery system to supply power to the at least one of the offboard vehicle load and the onboard accessory load;
   determine whether the projected SOH value is less than the first SOH threshold and the another projected SOH value is greater than the first SOH threshold; and
   generate the customer SOH alert based on a determination that the projected SOH value is less than the first SOH threshold and the another projected SOH value is greater than the first SOH threshold.

14. The system of claim 1, wherein the onboard accessory load comprises a connected camera system.

15. The system of claim 1 wherein the offboard vehicle load comprises at least one of a vehicle to grid (V2G), vehicle to home (V2H), vehicle to vehicle (V2V), vehicle to load (V2L), power take off (PTO), and electronic PTO.

16. A method for monitoring a state of health (SOH) of a battery system of an electric vehicle (EV) comprising:
  generating a projected SOH value of a battery system of the EV at one of a future vehicle age and a future total EV mileage, wherein:
    the projected SOH value of the battery system is based on a current SOH value of the battery system and historical SOH values of the battery system; and
    the current SOH value of the battery system and the historical SOH values of the battery system are based on use of the battery system to supply power to at least one of an offboard vehicle load and an onboard accessory load; and
  based on a determination that the projected SOH value of the battery system is less than a first SOH threshold at the one of the future vehicle age and the future total EV mileage;
    generating a customer SOH alert associated with limitations in connection with the use of the battery system to supply power to the at least one of the offboard vehicle load and the onboard accessory load for display on a display device of the EV;
    disabling an ability of the battery system to supply power to all of the at least one of the offboard vehicle load and the onboard accessory load; and
    wherein the customer SOH alert comprises a first notification that the ability of battery system to supply power to all of the at least one of the offboard vehicle load and the onboard accessory load has been disabled.

17. The method of claim 16, further comprising:
  generating the projected SOH value of the battery system at the future total EV mileage, wherein:
    the projected SOH value of the battery system is based on the current SOH value of the battery system at a current total EV mileage and historical SOH values of the battery system during corresponding historical total EV mileages;
    each total EV mileage is a sum of a driven EV mileage and a virtual EV mileage; and
    each virtual EV mileage is based on the use of the battery system to supply power to the at least one of the offboard vehicle load and the onboard accessory load; and
  determining whether the projected SOH value of the battery system is less than the first SOH threshold at the future total EV mileage.

18. The method of claim 16, further comprising:
  generating the projected SOH value of the battery system at the future vehicle age, wherein the projected SOH value of the battery system is based on the current SOH value of the battery system and historical SOH values of the battery system during corresponding historical vehicle ages; and
  determining whether the projected SOH value of the battery system is less than the first SOH threshold at the future vehicle age.

19. An electric vehicle (EV) comprising:
  at least one processor; and
  at least one memory communicatively coupled to the at least one processor, the at least one memory comprising instructions that upon execution by the at least one processor, cause the at least one processor to:
    generate a projected SOH value of a battery system of the EV at one of a future vehicle age and a future total EV mileage, wherein:
      the projected SOH value of the battery system is based on a current SOH value of the battery system and historical SOH values of the battery system; and
      the current SOH value of the battery system and the historical SOH values of the battery system are based on use of the battery system to supply power to at least one of an offboard vehicle load and an onboard accessory load; and
    based on a determination that the projected SOH value of the battery system is less than a first SOH threshold at the one of the future vehicle age and the future total EV mileage:
      generate a customer SOH alert associated with limitations in connection with the use of the battery system to supply power to the at least one of the offboard vehicle load and the onboard accessory load for display on a display device of the EV;
      disable an ability of the battery system to supply power to all of the at least one of the offboard vehicle load and the onboard accessory load; and
      wherein the customer SOH alert comprising a first notification that the ability of battery system to supply power to all of the at least one of the offboard vehicle load and the onboard accessory load has been disabled.

20. The EV of claim 19, wherein the at least one memory comprises further instructions that upon execution by the at least one processor, cause the at least one processor to:
  generate the projected SOH value of the battery system at the future vehicle age, wherein the projected SOH value of the battery system is based on the current SOH value of the battery system and historical SOH values of the battery system during corresponding historical vehicle ages; and
  determine whether the projected SOH value of the battery system is less than the first SOH threshold at the future vehicle age.

* * * * *